(12) United States Patent
Cohn et al.

(10) Patent No.: US 9,658,746 B2
(45) Date of Patent: May 23, 2017

(54) ACCESSIBLE READING MODE TECHNIQUES FOR ELECTRONIC DEVICES

(71) Applicant: Nook Digital, LLC, New York, NY (US)

(72) Inventors: Harold E. Cohn, Incline Village, NV (US); Luis D. Mosquera, Foster City, CA (US); Matthew Pallakoff, Mountain View, CA (US)

(73) Assignee: NOOK DIGITAL, LLC, New York, NY (US)

( * ) Notice: Subject to any disclaimer, the term of this patent is extended or adjusted under 35 U.S.C. 154(b) by 373 days.

(21) Appl. No.: 13/946,538

(22) Filed: Jul. 19, 2013

(65) Prior Publication Data

US 2014/0026055 A1    Jan. 23, 2014

Related U.S. Application Data

(60) Provisional application No. 61/674,098, filed on Jul. 20, 2012, provisional application No. 61/674,102, filed on Jul. 20, 2012.

(51) Int. Cl.
*G06F 3/048* (2013.01)
*G06F 3/0483* (2013.01)
(Continued)

(52) U.S. Cl.
CPC .......... *G06F 3/0483* (2013.01); *G06F 3/0482* (2013.01); *G06F 3/04883* (2013.01)

(58) Field of Classification Search
CPC ...................................................... G06F 3/048
(Continued)

(56) References Cited

U.S. PATENT DOCUMENTS

| 4,896,543 A | 1/1990 | Gullman |
| 5,633,471 A | 5/1997 | Fukushima |

(Continued)

FOREIGN PATENT DOCUMENTS

| EP | 122150 A1 | 7/1996 |
| WO | 2012170745 A2 | 12/2012 |

OTHER PUBLICATIONS

Non-Final Office Action received for U.S. Appl. No. 13/912,976. Mail Date: Jan. 5, 2015, 15 pages.
(Continued)

*Primary Examiner* — Xuyang Xia
(74) *Attorney, Agent, or Firm* — Finch & Maloney PLLC

(57) ABSTRACT

Techniques are disclosed for providing accessible reading modes in electronic computing devices. The user can transition between a manual reading mode and an automatic reading mode using a transition gesture. The manual reading mode may allow the user to navigate through content, share content with others, aurally sample and select content, adjust the reading rate, font, volume, or configure other reading and/or device settings. The automatic reading mode facilitates an electronic device reading automatically and continuously from a predetermined point with a selected voice font, volume, and rate, and only responds to a limited number of command gestures that may include scrolling to the next or previous sentence, paragraph, page, chapter, section or other content boundary. For each reading mode, earcons may guide the selection and/or navigation techniques, indicate content boundaries, confirm user actions or selections, or to otherwise provide an intuitive and accessible user experience.

17 Claims, 14 Drawing Sheets

(51) Int. Cl.
  *G06F 3/0482* (2013.01)
  *G06F 3/0488* (2013.01)
(58) Field of Classification Search
  USPC .................................................. 715/727
  See application file for complete search history.

(56) References Cited

U.S. PATENT DOCUMENTS

| | | | |
|---|---|---|---|
| 5,844,557 A | 12/1998 | Shively, II | |
| 6,259,438 B1 | 7/2001 | Fleck et al. | |
| 6,334,157 B1 | 12/2001 | Oppermann et al. | |
| 6,933,928 B1 | 8/2005 | Lilienthal | |
| 6,956,564 B1 | 10/2005 | Williams | |
| 7,107,533 B2 | 9/2006 | Duncan et al. | |
| 7,649,524 B2 | 1/2010 | Haim et al. | |
| 7,840,912 B2 | 11/2010 | Elias et al. | |
| 7,898,541 B2 | 3/2011 | Hong et al. | |
| RE42,738 E | 9/2011 | Williams | |
| 8,059,101 B2 | 11/2011 | Westerman et al. | |
| 8,239,413 B2 | 8/2012 | Hubert | |
| 8,274,536 B2 | 9/2012 | Chaudhri et al. | |
| 8,286,104 B1 | 10/2012 | Yonge-Mallo | |
| D670,713 S | 11/2012 | Cranfill et al. | |
| RE44,103 E | 3/2013 | Williams | |
| 8,400,417 B2 | 3/2013 | Ording et al. | |
| 8,452,600 B2 | 5/2013 | Fleizach | |
| 8,508,494 B2 | 8/2013 | Moore | |
| 8,659,555 B2 | 2/2014 | Pihlaja | |
| 2001/0025289 A1 | 9/2001 | Jenkins et al. | |
| 2002/0116421 A1 | 8/2002 | Fox et al. | |
| 2005/0216839 A1* | 9/2005 | Salvucci | G11B 27/34 715/723 |
| 2006/0053372 A1* | 3/2006 | Adkins | G09B 7/02 715/709 |
| 2006/0067577 A1* | 3/2006 | Marggraff | G06F 3/0317 382/187 |
| 2007/0047002 A1 | 3/2007 | Hull et al. | |
| 2008/0020356 A1 | 1/2008 | Saba | |
| 2008/0036747 A1 | 2/2008 | Hope | |
| 2009/0228798 A1 | 9/2009 | Kephart et al. | |
| 2009/0295734 A1 | 12/2009 | Hendrickson et al. | |
| 2010/0100854 A1 | 4/2010 | Russell et al. | |
| 2010/0192086 A1 | 7/2010 | Kocienda et al. | |
| 2010/0229130 A1 | 9/2010 | Edge et al. | |
| 2010/0259482 A1 | 10/2010 | Ball | |
| 2010/0262659 A1 | 10/2010 | Christiansen et al. | |
| 2010/0299638 A1 | 11/2010 | Choi | |
| 2010/0318895 A1 | 12/2010 | Steinberger et al. | |
| 2010/0324902 A1 | 12/2010 | Kurzweil et al. | |
| 2010/0328052 A1 | 12/2010 | Pasquero et al. | |
| 2011/0050591 A1 | 3/2011 | Kim et al. | |
| 2011/0167350 A1 | 7/2011 | Hoellwarth | |
| 2011/0191675 A1 | 8/2011 | Kauranen | |
| 2011/0210926 A1 | 9/2011 | Pasquero et al. | |
| 2011/0234543 A1 | 9/2011 | Gardenfors et al. | |
| 2011/0258542 A1 | 10/2011 | Kenney et al. | |
| 2011/0273379 A1 | 11/2011 | Chen et al. | |
| 2011/0283241 A1 | 11/2011 | Miller et al. | |
| 2011/0304558 A1 | 12/2011 | Pasquero et al. | |
| 2011/0307833 A1 | 12/2011 | Dale et al. | |
| 2011/0310026 A1* | 12/2011 | Davis | G06F 3/0488 345/173 |
| 2012/0046947 A1* | 2/2012 | Fleizach | G10L 13/00 704/260 |
| 2012/0050159 A1 | 3/2012 | Yu et al. | |
| 2012/0056821 A1 | 3/2012 | Goh | |
| 2012/0084694 A1* | 4/2012 | Sirpal | G06F 1/1616 715/769 |
| 2012/0084704 A1* | 4/2012 | Lee | G06F 3/017 715/776 |
| 2012/0110517 A1 | 5/2012 | Sparks et al. | |
| 2012/0124505 A1* | 5/2012 | St. Jacques, Jr. | G06F 3/0483 715/776 |
| 2012/0127110 A1 | 5/2012 | Amm et al. | |
| 2012/0139879 A1 | 6/2012 | Kim et al. | |
| 2012/0192093 A1* | 7/2012 | Migos | G06F 3/04883 715/773 |
| 2012/0192118 A1* | 7/2012 | Migos | G06F 1/1626 715/863 |
| 2012/0221938 A1 | 8/2012 | Patterson et al. | |
| 2012/0235901 A1 | 9/2012 | Binder | |
| 2012/0235938 A1* | 9/2012 | Laubach | G06F 3/0416 345/173 |
| 2012/0242579 A1 | 9/2012 | Chua | |
| 2012/0242584 A1 | 9/2012 | Tuli | |
| 2012/0249768 A1 | 10/2012 | Binder | |
| 2012/0272144 A1 | 10/2012 | Radakovitz et al. | |
| 2012/0280947 A1 | 11/2012 | Weaver et al. | |
| 2012/0299853 A1 | 11/2012 | Dagar | |
| 2012/0306765 A1 | 12/2012 | Moore | |
| 2012/0306772 A1* | 12/2012 | Tan | G06F 3/04842 345/173 |
| 2012/0311438 A1 | 12/2012 | Cranfill et al. | |
| 2012/0313848 A1* | 12/2012 | Galor | G06F 3/005 345/156 |
| 2012/0324355 A1 | 12/2012 | Mbenkum et al. | |
| 2012/0329529 A1 | 12/2012 | van der Raadt | |
| 2013/0016045 A1 | 1/2013 | Zhao et al. | |
| 2013/0024820 A1 | 1/2013 | Kirkpatrick | |
| 2013/0036383 A1 | 2/2013 | Yuan et al. | |
| 2013/0047115 A1 | 2/2013 | Migos et al. | |
| 2013/0055141 A1 | 2/2013 | Arriola et al. | |
| 2013/0063364 A1 | 3/2013 | Moore | |
| 2013/0073998 A1 | 3/2013 | Migos et al. | |
| 2013/0076632 A1 | 3/2013 | Sirpal et al. | |
| 2013/0076637 A1 | 3/2013 | Teltz | |
| 2013/0076638 A1 | 3/2013 | Sirpal et al. | |
| 2013/0076781 A1 | 3/2013 | Sirpal et al. | |
| 2013/0113699 A1 | 5/2013 | Lim | |
| 2013/0117702 A1 | 5/2013 | Jang et al. | |
| 2013/0120271 A1 | 5/2013 | Lee et al. | |
| 2013/0130216 A1 | 5/2013 | Morton et al. | |
| 2013/0135234 A1 | 5/2013 | Hisano et al. | |
| 2013/0139078 A1 | 5/2013 | Chuang et al. | |
| 2013/0139107 A1 | 5/2013 | Jung | |
| 2013/0151955 A1 | 6/2013 | Williams | |
| 2013/0155094 A1 | 6/2013 | Ahn | |
| 2013/0159939 A1 | 6/2013 | Krishnamurthi | |
| 2013/0162532 A1 | 6/2013 | Cheng et al. | |
| 2013/0185680 A1 | 7/2013 | Chaudhri et al. | |
| 2013/0194308 A1 | 8/2013 | Privault et al. | |
| 2013/0212454 A1 | 8/2013 | Casey | |
| 2013/0222274 A1 | 8/2013 | Mori et al. | |
| 2013/0232408 A1 | 9/2013 | Xu | |
| 2013/0268826 A1 | 10/2013 | Nowakowski et al. | |
| 2013/0304474 A1 | 11/2013 | Conkie et al. | |
| 2013/0328809 A1 | 12/2013 | Smith | |
| 2013/0332827 A1 | 12/2013 | Smith | |
| 2014/0123032 A1 | 5/2014 | Lanz et al. | |
| 2014/0127667 A1 | 5/2014 | Iannacone | |
| 2014/0142954 A1 | 5/2014 | Cameron et al. | |
| 2014/0160035 A1 | 6/2014 | Sauer et al. | |
| 2014/0189056 A1 | 7/2014 | St. Clair et al. | |
| 2014/0189524 A1 | 7/2014 | Murarka et al. | |
| 2014/0189531 A1 | 7/2014 | Murarka et al. | |
| 2014/0189539 A1 | 7/2014 | St. Clair et al. | |
| 2014/0210729 A1 | 7/2014 | Chattopadhyay et al. | |
| 2014/0215329 A1 | 7/2014 | Zilberman et al. | |
| 2014/0215339 A1 | 7/2014 | Klein et al. | |
| 2014/0215340 A1 | 7/2014 | Shetty et al. | |
| 2014/0223381 A1 | 8/2014 | Huang et al. | |
| 2014/0354594 A1 | 12/2014 | Kreutzer et al. | |

OTHER PUBLICATIONS

Final Office Action received for U.S. Appl. No. 13/912,976. Mail Date: Jun. 5, 2015, 20 pages.
"Gesture Search for Google Mobile", printed from www.google.com/mobile/gesture-search on Dec. 26, 2012.
Andrew Bragdon et al., "Experimental Analysis of Touch-Screen Gesture Designs in Mobile Environments", Proceedings of the

(56) References Cited

OTHER PUBLICATIONS

SIGCHI Conference on Human Factors in Computing Systems, pp. 403-412 (2011).
"PAiA-Touch Switches," PAiA Corporation USA, file:///S:/Client%20Files/Barnes%20&%20Noble/IDS%20Master%20Folder/S&G%20-%2 . . . , 3 pages, printed from the Internet on Aug. 27, 2013.
"Adonit Jot Touch (for iPad)," Adonit Jot Touch (for iPad) Review & Rating—PCMag.com; http://www.pcmag.com/article2/0.2817.2411192.00.asp; 6 pages, printed from the internet on Jun. 20, 2013.
Volpe, Joseph, Amazon patents intelligent pen for adding annotations to digital and printed media (updated), posted Mar. 6, 2012 at 5:39PM, http://www.engadget.com/2012/03/06/amazon-patents-intelligent-pen/, 3 pages, printed from the Internet on Jun. 20, 2013.
"Apple Secretly Filed Three Dynamic Smart Pen Patents in Europe that are Chock Full of Cool Ideas," http://www.patentlyapple.com/patently-apple/2013/02/apple-secretly-filed-three-dynamic-smart-pen-patents-in-europe-that-are-chock-full-of-cool-ideas.html, originally published Feb. 28, 2013, 13 pages, printed from the Internet on Aug. 13, 2013.
"Bamboo Stylus," Wacom Americas, http://www.wacom.com/en/products/stylus, 5 pages, printed from the Internet on Jun. 20, 2013.
Robertson, Adi, "Blue Tiger pressure-sensitive iOS stylus will work over Bluetooth 4.0," Http://www.theverge.com/2012/3/7/2851562/blue-tiger-ten-one-design-pressure-sensitive-bluetooth-4-0-stylus, 1 page, printed from the Internet on Aug. 2, 2013.
Malacria, et al., "Clutch-Free Panning and Integrated Pan-Zoom Control on Touch-Sensitive Surfaces: The CycloStar Approach," CHI 2010, Apr. 10-15, 2010, Atlanta, Georgia, USA. Copyright 2010 ACM 978-1-60558-929-9, 10 pages, Sep. 10, 2004.
"Pen," DuoSense Pen, N-trig Hands-on computing, http://www.n-trig.com/Content.aspx?Page=DigitalPencil, 3 pages, printed from the Internet on Jun. 20, 2013.
"Easing functions," Easing Functions Cheat Sheet, http://easings.net/, 3 pages, printed from the Internet on Jun. 17, 2013.
Kirupa, Easing Functions (aka Timing Functions) in CSS3, printed Apr. 3, 2013, kirupa.com, http://www.kirupa.com/html5/easing_functions_css3.htm, 16 pages, printed from the Internet on Jun. 18, 2013.
"EMR (Electro-Magnetic Resonance) Technology—The De Facto Standard for Pen Tablet Devices is Realized using EMR Technology," Wacom Components: Input Technology: EMR Technology, http://wacom-components.com/english/technology/emr.html, 5 pages, printed from the Internet on Aug. 2, 2013.
"Simultaneous Pen & Touch: The Natural Way to Work," Perceptive Pixel Active Stylus, www.perceptivepixel.com/_literature_136086/Active_Stylus, 2 pages, printed from the Internet on Dec. 14, 2012.
"Future Apple Notebooks & Tablets may use Acoustic Commands—Patently Apple," originally published Feb. 18, 2011, Http://www.patentlyapple.com/patently-apple/2011/02/future-apple-notebooks-tablets-may,6 pages, printed from the Internet on Nov. 3, 2012.
"Guidelines for selecting text and images (Windows Store apps)," http://msdn.microsoft.com/en-us/library/windows/apps/hh465334, 5 pages, printed from the Internet on Jun. 20, 2013.
Lutz, Zachary, "Hands-on with wireless, ultrasonic stylus an touchless gestures at MWC (video)," posted Mar. 1, 2012 at 8:28 AM, http://www.engadgel.com/2012/03/01/hands-on-with-wireless-ultrasonic-stylus-and-touchl, 3 pages, printed from the Internet on Jun. 20, 2013.

"HEX3 JaJa Pressure Sensitive Stylus," HEX3 JaJa Pressure Sensitive Stylus Review & Rating—PCMag.com, http://www.pcmag.com/article2/0,2817,2411194,00.asp, 6 pages, printed from the Internet on Jun. 20, 2013.
"How do WACOM tablets work?," tablel4u.co.uk, http://www.lablet4u.co.uk/techinfo.html, 2 pages, printed from the Internet on Jun. 20, 2013.
Kim, Arnold, "Multi-Touch Page Flipping eBook Concept Shown on an iPad," posted Jan. 22, 2012 at 10:52pm PST, MacRumors—news and rumors you care about, http://www.macrumors.com/2012/01/23/multi-touch-page-ftipping-ebook-concept-shown-6 pages, printed from the Internet on Nov. 3, 2012.
"Desktop Touchscreens,"—Desktop touchscreens explained, http://www.touchscreenmagazine.nl/touchscreen-solutions/desktop-touchscreens, 1 page, printed from the Internet on Nov. 3, 2012.
"MTStylus Wireless Stereo Stylus for iPhone/Android Phone & Tablet," dexim-MTStylus Wireless Stereo Stylus, Http://www.dexim.nel/contentnl.php?id=165&pid=11, 2 pages, printed from the Internet on Jun. 20, 2013.
"Padblue 2," BRANDO—mobile.brando.com, http://mobile.brando.com/Padblue-2_p9162c1577d94.html., 4 pages, printed from the Internet on May 10, 2013.
"Fingas, Jon, "Panasonic mobile devices to use Anoto's pattern-based pen input technology," posted Jan. 8, 2013 at 1 :OOPM, http://www.engadgel.com/2013/01 /08/panasonic-mobile-devices-to-use-anoto-pattern-pen-, 4 pages, printed from the Internet on Jun. 20, 2013."
"Bluetooth 4.0 SmartPen the future just got a little brighter," Pogo Connect, http://tenonedesign.com/connecl.php, 7 pages, printed from the Internet on Jun. 20, 2013.
"Quick, Darren, "Pressure sensitive technology set to bring 3D capability to touchscreens," posted on Jan. 31, 2010, Mobile Technology, http://www.gizmag.com/new-touchscreen-technology, 4 pages, printed from the Internet on Aug. 2, 2013."
Rigg, Jamie, "Sony tries to patent stylus with friction-based haptic feedback," posted on Nov. 22, 2012 at 9:50 AM, http://www.engadget.com/2012/11/22/sony-haptic-feedback-stylus-patent/, 2 pages, printed from the Internet on Jun. 20, 2013.
"Stylus Hanging Bluetooth Headset," BRANDO—mobile.brando.com, http://mobile.brando.com/prod_detail.php?prod_id=03291, 4 pages, printed from the Internet on May 10, 2013.
"The JukeStyle is a great budget stylus for your iOS devices," stylus Archives—iPad News, http://www.ipadnews.nl/tag/stylus/, 44 pages, printed from the Internet on Jun. 20, 2013.
Lavrinc, Damon, "Why Flipping Through Paper-Like Pages Endures in the Digital World," originally posted on May 11, 2012 at 3:48PM, Gadget Lab, Http://www.wired.com/gadgetlab/2012/05/why-ftipping-through-paper-like-pages-endures-in-the-digital-world/, 5 pages, printed from the Internet on May 6, 2013.
"explaining how the sPen tech works (and is very diff than other styluses)," http://forum.xda-developers.com/showthread.php?t=, 1 page, printed from the Internet on Jan. 15, 2013.
Kanai, et al., "Intra-Rendition Navigation," Copyright 2012-2013 International Digital Publishing Forum (IDPF), 13 pages.
"Comics by comiXology," Comic Book Reader Guide, http://www.comicbookreaderguide.com/comics-by-comixology/, 24 pages, printed from the Internet on May 6, 2013.
"NFC Forum: Frequently Asked Questions," http://www.nfc-forum.org/resources/faqs#acknowledge, 11 pages, printed from the Internet on Feb. 18, 2013.
"How to Remote Wipe an iPhone or iPad," OSXDaily, http://osxdaily.com/2012/06/05/remote-wipe-iphone-or-ipadi, 4 pages, printed from the Internet on Feb. 2, 2013.
"Screen hotspot," Wikipedia, the free encyclopedia, http://en.wikipedia.org/wiki/Screen_hotspot, 1 page, printed from the Internet on May 15, 2013.

\* cited by examiner

ACCESSIBLE READING MODE TECHNIQUES FOR ELECTRONIC DEVICES

RELATED APPLICATIONS

This application claims the benefit of U.S. Provisional Application Nos. 61/674,098 and 61/674,102 both filed on Jul. 20, 2012 each of which are herein incorporated by reference in their entirety.

FIELD OF THE DISCLOSURE

This disclosure relates to electronic display devices, and more particularly, to user interface (UI) techniques for interacting with computing devices.

BACKGROUND

Electronic display devices such as tablets, eReaders, mobile phones, smart phones, personal digital assistants (PDAs), and other such touch screen electronic display devices are commonly used for displaying consumable content. The content may be, for example, an eBook, an online article or blog, images, a movie or video, a map, just to name a few types. Such display devices are also useful for displaying a user interface that allows a user to interact with an application running on the device. The textual content and/or screen controls may be spoken aloud to the user. The user interface may include, for example, one or more touch screen controls and/or one or more displayed labels that correspond to nearby hardware buttons. The touch screen display may be backlit or not, and may be implemented for instance with an LED screen or an electrophoretic display. Such devices may also include other touch sensitive surfaces, such as a track pad (e.g., capacitive or resistive touch sensor) or touch sensitive housing (e.g., acoustic sensor).

DETAILED DESCRIPTION

Figure 1A:
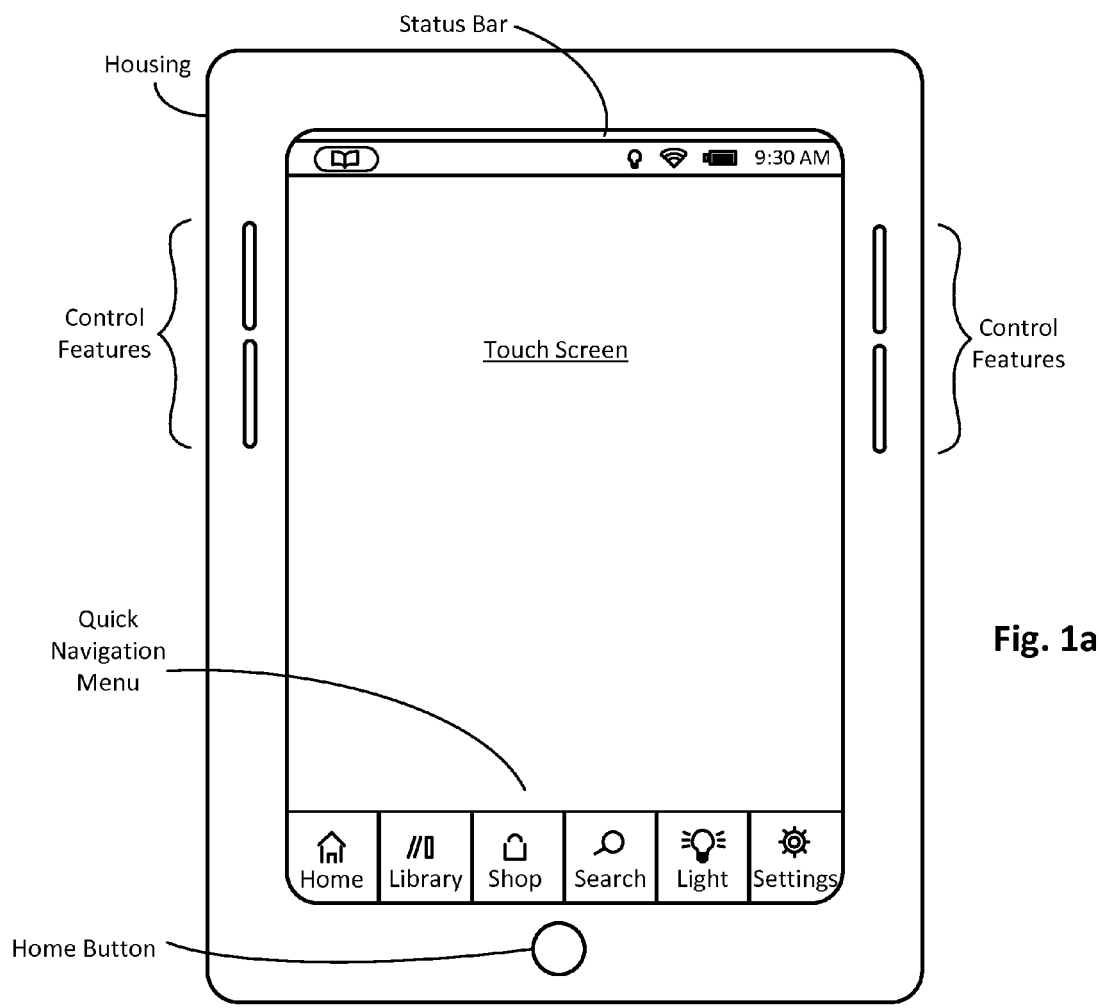
FIGS. 1a-b illustrate an example electronic touch screen device having multiple accessible reading modes configured in accordance with an embodiment of the present invention.

Techniques are disclosed for providing accessible reading modes in electronic computing devices. The device may be a touch screen mobile device, or any other device with a touch sensitive surface that can detect user gestures. The user can activate a manual or automatic reading mode using an activation gesture, and may transition between the manual reading mode and the automatic reading mode using a transition gesture. The manual reading mode may, for example, allow the user to navigate through content, manually direct the reading of textual content using horizontal dragging gestures, share content with others, aurally sample and select content, add notes to selected content, share content, adjust the reading rate, font, volume, or configure other reading and/or device settings. The automatic reading mode facilitates an electronic device reading automatically and continuously from a predetermined point with a selected voice font, volume, and rate, and only responds to a limited number of command gestures that may include, for example, adjusting the reading rate and/or scrolling to the next or previous sentence, paragraph, page, chapter, section or other content boundary. For each reading mode, earcons may guide the selection and/or navigation techniques, indicate content boundaries, confirm user actions or selections, or to otherwise provide an intuitive and accessible user experience.

General Overview

As previously explained, electronic display devices such as tablets, eReaders, and smart phones are commonly used for displaying user interfaces and consumable content. The user of such devices can typically consume the displayed content with relative ease. In some instances, users who are unable to view or read text or other content on the screen may wish to consume textual content, adjust device settings, and/or select content on the device. While some electronic devices may aurally present textual content to a user, offer printed instructions on a screen protector (e.g., using a braille-embossed screen cover), or offer a hunt-and-peck approach for adjusting device settings, the multiple accessible reading modes described herein may provide a more intuitive or otherwise positive user experience.

Thus, and in accordance with an embodiment of the present invention, techniques are disclosed for providing accessible multiple reading modes in electronic touch screen devices. In one embodiment, a manual reading mode and an automatic reading mode may be provisioned by the device's UI, wherein the manual mode allows the user to actively navigate and/or adjust device settings. In one embodiment, the manual reading mode allows the user to navigate through content, share content with others, aurally sample and select content, add notes to selected content, adjust the reading rate, font, volume, or configure other reading and/or device settings. In one embodiment, the automatic reading mode facilitates an electronic device reading automatically and continuously from a predetermined point with a selected voice font, volume, and rate, and only detects a limited number of command gestures (e.g., skip sentence, skip page, etc.). In some cases, the voice font may include various voices of different gender, accents, or characteristics in which the textual content may be read to the user. The automatic mode may also, for example, play earcon audio cues upon passing sentences, paragraphs, pages, chapters, or other content boundaries. In manual mode, however, the user may change different reading rates, fonts, volumes, etc. The user can engage an automatic or manual reading mode by performing a reading mode activation gesture, or switch between reading modes using a simple transition gesture or control feature action. In one embodiment, the entire touch screen display may be treated as a single button to facilitate transitioning between automatic and manual modes, when the accessible user interface is active. For example, a single tap on the touch sensitive surface may transition the device from automatic mode to manual mode, while a double-tap gesture on the touch sensitive surface may transition the device from manual mode to automatic mode, in some embodiments. The single and double taps can be distinguished from other taps, based on the hold time. For instance, the taps to toggle between manual and automatic modes can be quick taps (e.g., quick tap and release of less than 1 second), while other taps intended for different functions can have a longer hold time (e.g., greater than 1 second). In any case, treating the entire touch screen as a single button when the accessible user interface is active effectively allows the user to interact with the device without regard to the location of any touch screen control features. Thus, the user need not be able to see any specific UI control features or otherwise touch those features. This look-free feature, in combination with the manual and automatic mode functions as variously described herein, allows a rich user experience for vision-impaired users or users who can otherwise not focus their attention on the display to interact with the device. An earcon may be, for example, a brief and distinctive sound or chime representing a specific action or event, conveying other information, or prompting a user action.

While operating in the manual reading mode, the user may, for example, aurally sample textual content on the device screen using a short press gesture, direct the reading of textual content using horizontal dragging gestures, navigate through menu options using vertical swipe gestures, select words and sections of text and read aloud selected content using various gesture combinations, just to name a few functions. In the automatic reading mode, the user may listen to textual content and perform a limited number of functions, including for example, adjusting the reading rate using vertical swipe gestures, and scrolling or skipping to the next or previous sentence, paragraph, page, chapter, section, article, or some other content boundary using various horizontal swipe gestures with one or more contact points. While scrolling through larger sections of content, such as chapters or articles, the automatic reading mode may remember where the user was currently reading and create a virtual bookmark at that page that prompts the reading mode to make an additional stop at that page if it is not the beginning of a chapter or other content section. For each of these reading modes, earcons may be employed to guide the selection and/or navigation techniques, indicate content boundaries, confirm user actions or selections, or to otherwise provide an intuitive and accessible user experience.

As used herein, a swipe gesture may include a sweeping or dragging gesture across at least a portion of the touch sensitive surface whether directly contacting that surface or hovering over that surface (e.g., within a few centimeters or otherwise close enough to be detected by the touch sensitive surface). In some embodiments, the swipe gesture may be performed at a constant speed in one single direction, or may also be an accelerated flick gesture. The gestures can be performed, for example, with the tip of a finger or a stylus, or any other suitable implement capable of providing a detectable swipe gesture. To facilitate detection of a substantially horizontal and/or vertical swipe gesture with reference to the bottom of the electronic device's screen, any swipe gesture that is, for example, within a range of 45 degrees of the horizontal or vertical may be treated as a horizontal or vertical gesture.

Given the global nature and/or uniqueness of the engagement mechanism, in accordance with some example embodiments, the accessible reading modes can be similarly invoked within multiple diverse applications, for example, an eReader, Internet browser, picture viewer, file browser, or any other textual content. In such embodiments, the accessible reading modes may be invoked without conflicting with other global gestures that might also be used by the device's operating system. Numerous uniquely identifiable engagement schemes that exploit a touch sensitive surface can be used as will be appreciated in light of this disclosure. Further note that any touch sensitive device (e.g., track pad, touch screen, or other touch sensitive surface, whether capacitive, resistive, acoustic or other touch detecting technology, regardless of whether a user is physically contacting the device or using some sort of implement, such as a stylus) may be used to detect the user contact, and the claimed invention is not intended to be limited to any particular type of touch sensitive technology, unless expressly stated. For ease of reference, user input is sometimes referred to as contact or user contact; however, direct and/or proximate contact (e.g., hovering within a few centimeters of the touch sensitive surface) can be used. In other words, in some embodiments, a user can operate the accessible menu navigation user interface without physically touching the touch sensitive device.

Architecture

Figure 1B:
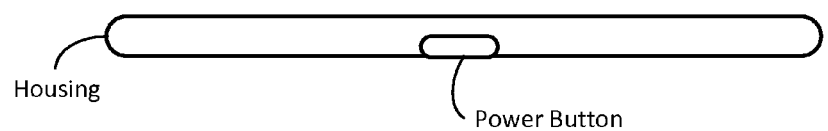

FIGS. 1a-b illustrate an example electronic touch sensitive device having multiple accessible reading modes configured in accordance with an embodiment of the present invention. As can be seen, in this example embodiment, the touch sensitive surface is a touch screen display. The device could be, for example, a tablet such as the NOOK® tablet or eReader by Barnes & Noble. In a more general sense, the device may be any electronic device having a touch sensitive user interface for detecting direct touch or otherwise sufficiently proximate contact, and capability for displaying content to a user, such as a mobile phone or mobile computing device such as a laptop, a desktop computing system, a television, a smart display screen, or any other device having a touch sensitive display or a non-sensitive display screen that can be used in conjunction with a touch sensitive surface. As will be appreciated in light of this disclosure, the claimed invention is not intended to be limited to any specific kind or type of electronic device or form factor.

As can be seen with this example configuration, the device comprises a housing that includes a number of hardware features such as a power button, control features, and a press-button (sometimes called a home button herein). A user interface is also provided, which in this example embodiment includes a quick navigation menu having six main categories to choose from (Home, Library, Shop, Search, Light, and Settings) and a status bar that includes a number of icons (a night-light icon, a wireless network icon, and a book icon), a battery indicator, and a clock. In one embodiment, an accessible UI may aurally present to the user the various menu categories from which the user may select the desired menu with a touch screen gesture or by activating a control feature. Some embodiments may have fewer or additional such UI features, or different UI features altogether, depending on the target application of the device.

Any such general UI controls and features can be implemented using any suitable conventional or custom technology, as will be appreciated.

The hardware control features provided on the device housing in this example embodiment are configured as elongated press-bars and can be used, for example, to page forward (using the top press-bar) or to page backward (using the bottom press-bar), such as might be useful in an eReader application. The power button can be used to turn the device on and off, and may be used in conjunction with a touch-based UI control feature that allows the user to confirm a given power transition action request (e.g., such as a slide bar or tap point graphic to turn power off). Numerous variations will be apparent, and the claimed invention is not intended to be limited to any particular set of hardware buttons or UI features, or device form factor.

In this example configuration, the home button is a physical press-button that can be used as follows: when the device is awake and in use, pressing the button will present to the user (either aurally or visually) the quick navigation menu, which is a toolbar that provides quick access to various features of the device. The home button may also be configured to cease an active function that is currently executing on the device (such as a manual or automatic reading mode), or close a configuration sub-menu that is currently open. The button may further control other functionality if, for example, the user presses and holds the home button. For instance, an example such push-and-hold function could engage a power conservation routine where the device is put to sleep or an otherwise lower power consumption mode. So, a user could grab the device by the button, press and keep holding as the device is stowed into a bag or purse. Thus, one physical gesture may safely put the device to sleep. In such an example embodiment, the home button may be associated with and control different and unrelated actions: 1) present the quick navigation menu; 2) exit a configuration sub-menu; and 3) put the device to sleep. As can be further seen, the status bar may also include a book icon (upper left corner). In some cases, selecting the book icon may provide bibliographic information on the content or provide the main menu or table of contents for the book, movie, playlist, or other content.

Figure 1C:
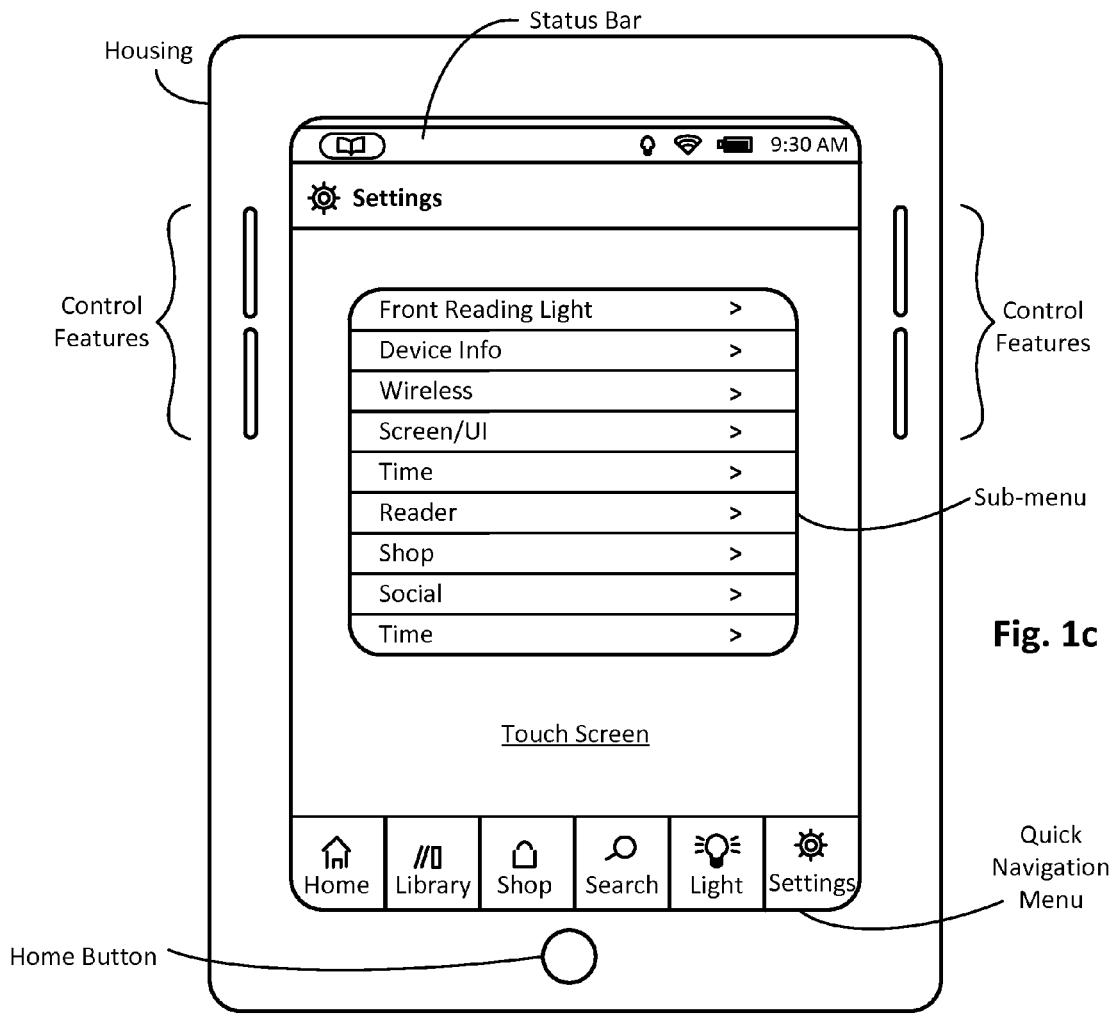
FIGS. 1c-f illustrate example configuration screen shots of the user interface of the electronic touch screen device shown in FIGS. 1a-b, configured in accordance with an embodiment of the present invention.
Figure 1D:
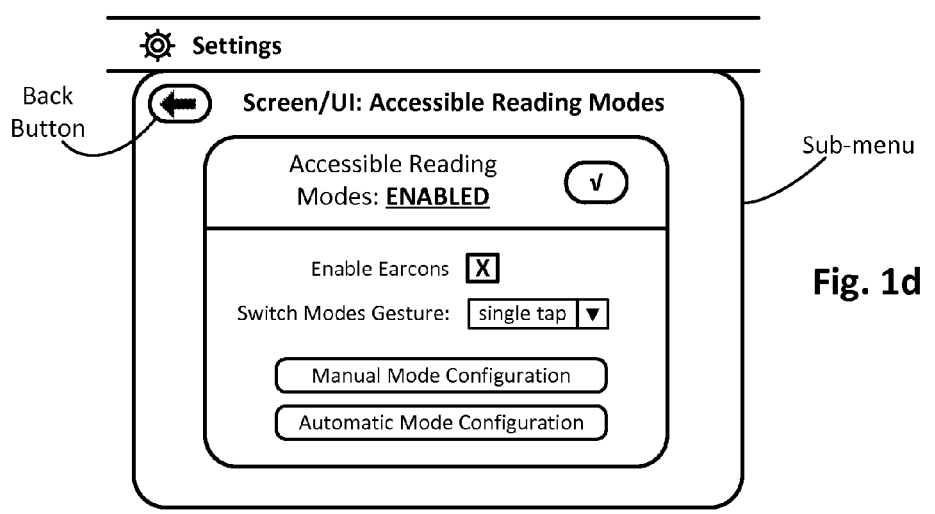

In one particular embodiment, an accessible reading modes configuration sub-menu, such as the one shown in FIG. 1*d*, may be accessed by selecting the Settings option in the quick navigation menu, which causes the device to present the general sub-menu shown in FIG. 1*c*. An accessible UI may, for example, aurally present to the user the various sub-menus and configuration options displayed in FIGS. 1*c-f*, and the user may select the desired sub-menu or option with a touch screen selection gesture, by activating a control feature, by speaking a voice command, or through some other input means. Other accessible selection options will be apparent in light of this disclosure. From this general sub-menu, the user can select any one of a number of options, including one designated Screen/UI in this specific example case. Selecting this sub-menu item may cause the configuration sub-menu of FIG. 1*d* to be presented, in accordance with an embodiment. In other example embodiments, selecting the Screen/UI option may present the user with a number of additional sub-options, one of which may include a so-called "accessible reading modes" option, which may then be selected by the user so as to cause the accessible reading modes configuration sub-menu of FIG. 1*d* to be presented. Any number of such menu schemes and nested hierarchies can be used, as will be appreciated in light of this disclosure. In other example embodiments, the multiple accessible reading modes are hard-coded such that no configuration sub-menus are needed or otherwise provided (e.g., performing the accessible reading mode gestures as described herein, with no user configuration needed). The degree of hard-coding versus user-configurability can vary from one embodiment to the next, and the claimed invention is not intended to be limited to any particular configuration scheme of any kind, as will be appreciated.

As will be appreciated, the various UI control features and sub-menus displayed to the user are implemented as touch screen controls in this example embodiment. Such UI screen controls can be programmed or otherwise configured using any number of conventional or custom technologies. In general, the touch screen display translates a touch (direct or hovering, by a user's hand, a stylus, or any other suitable implement) in a given location into an electrical signal that is then received and processed by the device's underlying operating system (OS) and circuitry (processor, display controller, etc.). In some instances, note that the user need not actually physically touch the touch sensitive device to perform an action. For example, the touch screen display may be configured to detect input based on a finger or stylus hovering over the touch sensitive surface (e.g., within 3 centimeters of the touch screen or otherwise sufficiently proximate to be detected by the touch sensing circuitry). Additional example details of the underlying OS and circuitry in accordance with some embodiments will be discussed in turn with reference to FIG. 2*a*.

The touch sensitive surface (or touch sensitive display, in this example case) can be any surface that is configured with touch detecting technologies, whether capacitive, resistive, acoustic, active-stylus, and/or other input detecting technology, including direct contact and/or proximate contact. In some embodiments, the screen display can be layered above input sensors, such as a capacitive sensor grid for passive touch-based input, such as with a finger or passive stylus contact in the case of a so-called in-plane switching (IPS) panel, or an electro-magnetic resonance (EMR) sensor grid for sensing a resonant circuit of a stylus. In some embodiments, the touch sensitive display can be configured with a purely capacitive sensor, while in other embodiments the touch screen display may be configured to provide a hybrid mode that allows for both capacitive input and EMR input, for example. In still other embodiments, the touch sensitive surface is configured with only an active stylus sensor. Numerous touch screen display configurations can be implemented using any number of known or proprietary screen based input detecting technologies. In any such embodiments, a touch sensitive controller may be configured to selectively scan the touch sensitive surface and/or selectively report user inputs detected directly on or otherwise sufficiently proximate to (e.g., within a few centimeters, or otherwise sufficiently close so as to allow detection) the detection surface (or touch sensitive display, in this example case). The limited gesture options described above in reference to the automatic reading mode may be implemented, for example, using the selective scanning and/or reporting techniques described herein.

As previously explained, and with further reference to FIGS. 1*c* and 1*d*, once the Settings sub-menu is presented (FIG. 1*c*), the user can then select the Screen/UI option. In response to such a selection, the accessible reading modes configuration sub-menu shown in FIG. 1*d* can be provided to the user, in accordance with one such example embodiment. The user can configure a number of features with respect to the accessible reading modes, in this example case. For instance, the configuration sub-menu includes a UI check box that when checked or otherwise selected by the user, effectively enables the accessible reading modes (shown in the enabled state); unchecking the box disables the modes. Other embodiments may have the accessible reading modes always enabled or enabled by a physical switch or button located on the device, for example. As previously explained, the accessible reading modes may associate a sound effect or earcon with certain menu actions and/or content boundaries. In some cases, the user may enable or disable the earcon function, and in this particular embodiment, the user has enabled earcons. In some cases, the user may transition from the manual reading mode to the automatic reading mode and the user may configure the transition gesture by picking from a drop-down menu. In this particular example, the user has configured the transition gesture to be a single tap gesture, while in other embodiments it might be a double tap gesture, or some other touch screen gesture.

Figure 1E:
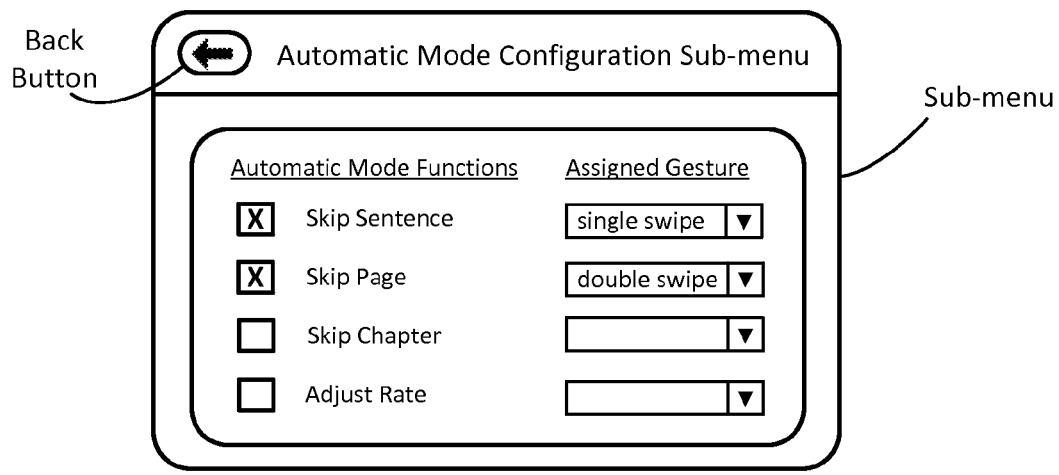
Figure 1F:
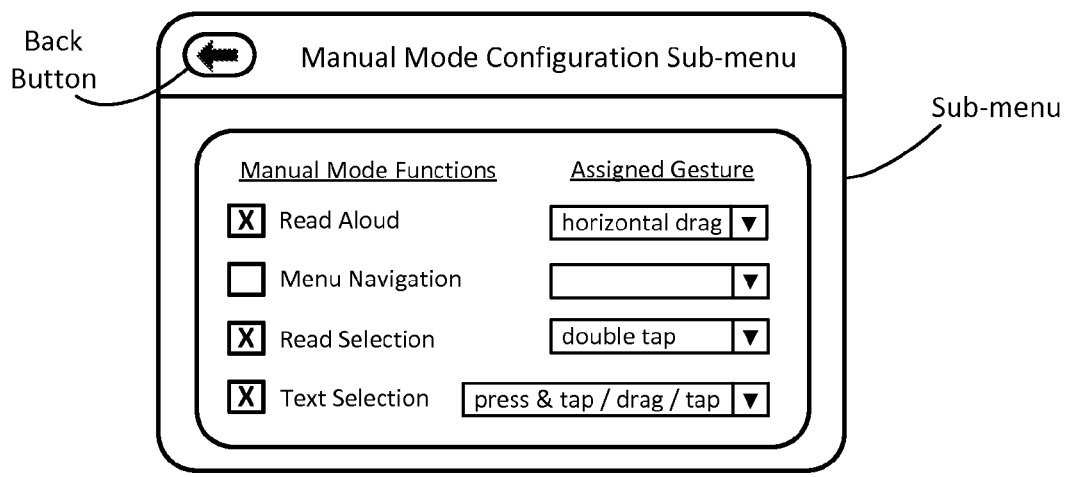

With reference to FIGS. 1e and 1f, once the accessible reading modes configuration sub-menu is presented (FIG. 1d), the user can then select either the manual mode configuration or automatic mode configuration in order to configure each operating mode. FIG. 1e shows an example automatic mode configuration sub-menu that allows the user to configure various automatic reading mode functions and gestures. The functions may include, for example, scrolling or skipping to the next or previous sentence, page, or chapter, and/or adjusting the reading rate and these functions may be assigned a gesture using a corresponding drop-down menu. In this particular example, the user has enabled the skipping sentence and page functions and has assigned them to a single-finger swipe and double-finger swipe gesture, respectively. FIG. 1f shows an example manual mode configuration sub-menu that allows the user to configure various manual reading mode functions and gestures. The functions may include, for example, reading aloud textual content displayed on the screen, navigating through menu options, reading selected text, and/or selecting textual content, add notes to selected content, share content, and these functions may be assigned a gesture using a corresponding drop-down menu. In this particular example, the user has enabled the read aloud, read selection, and text selection functions, and has assigned them gestures using the drop-down menus. The read aloud and read selection functions are assigned to a horizontal (either right to left or left to right) drag gesture and a double-tap gesture, respectively. The text selection has been associated with a sequence of gestures that will be discussed further in reference to FIGS. 3a-f. In some cases, while in the manual reading mode the user may navigate through various menu options using vertical swipe gestures.

As can be further seen, a back button arrow UI control feature may be provisioned on the screen for any of the menus provided, so that the user can go back to the previous menu, if so desired. In other embodiments, a universal back screen gesture may be performed in order to return to the previous menu. Note that configuration settings provided by the user can be saved automatically (e.g., user input is saved as selections are made or otherwise provided). Alternatively, a save button or other such UI feature can be provisioned, or a save gesture performed, which the user can engage as desired. The configuration sub-menus shown in FIGS. 1d-f are presented merely as examples of how multiple accessible reading modes may be configured by the user, and numerous other configurable or hard-codable aspects will be apparent in light of this disclosure. Other embodiments may confirm an action or menu selection using earcons, sound effects, or animations, and such sound effects and/or animations may be used to provide clarity to the function being performed or otherwise enhance the user experience. In some embodiments, such animations and sound effects may be user-configurable, while in other embodiments they are hard-coded.

Figure 2A:
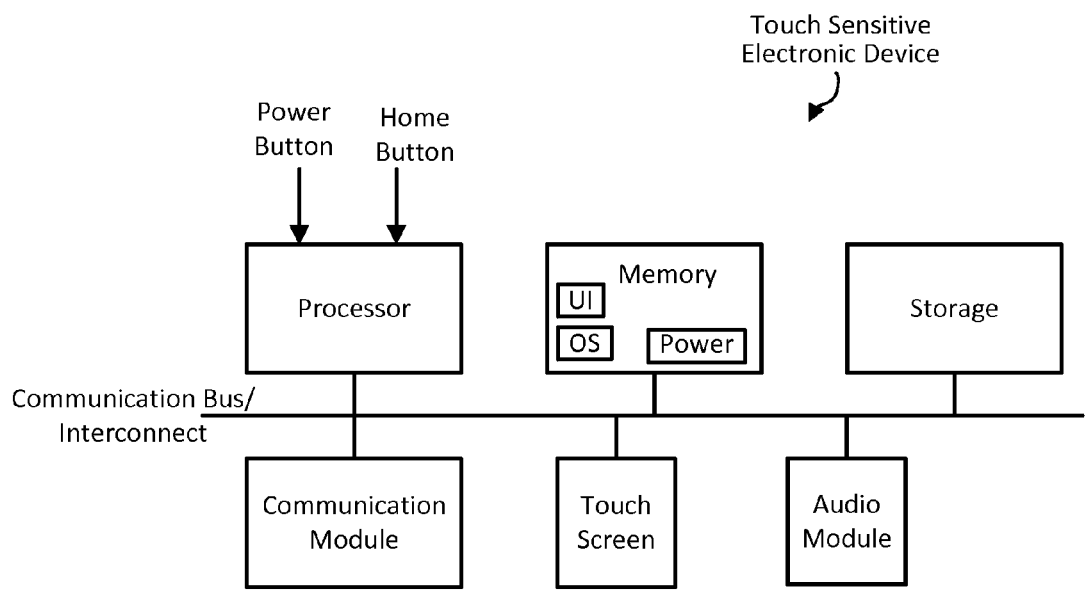
FIG. 2a illustrates a block diagram of an electronic touch screen device configured in accordance with an embodiment of the present invention.

FIG. 2a illustrates a block diagram of an electronic touch screen device configured in accordance with an embodiment of the present invention. As can be seen, this example device includes a processor, memory (e.g., RAM and/or ROM for processor workspace and storage), additional storage/memory (e.g., for content), a communications module, a touch screen, and an audio module. A communications bus and interconnect is also provided to allow inter-device communication. Other typical componentry and functionality not reflected in the block diagram will be apparent (e.g., battery, co-processor, etc). The touch screen and underlying circuitry is capable of translating a user's contact (direct or proximate) with the touch screen into an electronic signal that can be manipulated or otherwise used to trigger a specific user interface action, such as those provided herein. The principles provided herein equally apply to any such touch sensitive devices. For ease of description, examples are provided with touch screen technology.

In this example embodiment, the memory includes a number of modules stored therein that can be accessed and executed by the processor (and/or a co-processor). The modules include an operating system (OS), a user interface (UI), and a power conservation routine (Power). The modules can be implemented, for example, in any suitable programming language (e.g., C, C++, objective C, JavaScript, custom or proprietary instruction sets, etc), and encoded on a machine readable medium, that when executed by the processor (and/or co-processors), carries out the functionality of the device including a UI having multiple accessible reading modes as variously described herein. The computer readable medium may be, for example, a hard drive, compact disk, memory stick, server, or any suitable non-transitory computer/computing device memory that includes executable instructions, or a plurality or combination of such memories. Other embodiments can be implemented, for instance, with gate-level logic or an application-specific integrated circuit (ASIC) or chip set or other such purpose-built logic, or a microcontroller having input/output capability (e.g., inputs for receiving user inputs and outputs for directing other components) and a number of embedded routines for carrying out the device functionality. In short, the functional modules can be implemented in hardware, software, firmware, or a combination thereof.

The processor can be any suitable processor (e.g., Texas Instruments OMAP4, dual-core ARM Cortex-A9, 1.5 GHz), and may include one or more co-processors or controllers to assist in device control. In this example case, the processor receives input from the user, including input from or otherwise derived from the power button and the home button. The processor can also have a direct connection to a battery so that it can perform base level tasks even during sleep or low power modes. The memory (e.g., for processor workspace and executable file storage) can be any suitable type of memory and size (e.g., 256 or 512 Mbytes SDRAM), and in other embodiments may be implemented with non-volatile memory or a combination of non-volatile and volatile memory technologies. The storage (e.g., for storing consumable content and user files) can also be implemented with any suitable memory and size (e.g., 2 GBytes of flash memory). The display can be implemented, for example, with a 7 to 9 inch 1920×1280 IPS LCD touchscreen touch screen, or any other suitable display and touchscreen interface technology. The communications module can be, for instance, any suitable 802.11 b/g/n WLAN chip or chip set, which allows for connection to a local network, and so that content can be exchanged between the device and a remote system (e.g., content provider or repository depending on the application of the device). In some specific example embodiments, the device housing that contains all the various componentry measures about 7" to 9" high by about 5" to 6" wide by about 0.5" thick, and weighs about 7 to 8 ounces. Any number of suitable form factors can be used, depending on the target application (e.g., laptop, desktop, mobile phone, etc). The device may be smaller, for example, for smartphone and tablet applications and larger for smart computer monitor and laptop and desktop computer applications.

The operating system (OS) module can be implemented with any suitable OS, but in some example embodiments is implemented with Google Android OS or Linux OS or Microsoft OS or Apple OS. As will be appreciated in light of this disclosure, the techniques provided herein can be implemented on any such platforms. The power management (Power) module can be configured as typically done, such as to automatically transition the device to a low power consumption or sleep mode after a period of non-use. A wake-up from that sleep mode can be achieved, for example, by a physical button press and/or a touch screen swipe or other action. The user interface (UI) module can be, for example, based on touchscreen technology and the various example screen shots and use-case scenarios shown in FIGS. 1a, 1c-f, 3a-f, 4a-e, 5a-b, and 6a-d and in conjunction with the accessible menu navigation methodologies demonstrated in FIG. 7, which will be discussed in turn. The audio module can be configured to speak or otherwise aurally present, for example, menu options, a selected eBook, or any other textual content, and/or to provide verbal and/or other sound-based cues and earcons to guide the accessible reading modes, as will be appreciated in light of this disclosure. Numerous commercially available text-to-speech modules can be used, such as Verbose text-to-speech software by NCH Software. In some example cases, if additional space is desired, for example, to store digital books or other content and media, storage can be expanded via a microSD card or other suitable memory expansion technology (e.g., 32 GBytes, or higher). Further note that although a touch screen display is provided, other embodiments may include a non-touch screen and a touch sensitive surface such as a track pad, or a touch sensitive housing configured with one or more acoustic sensors, etc.

Client-Server System

Figure 2B:
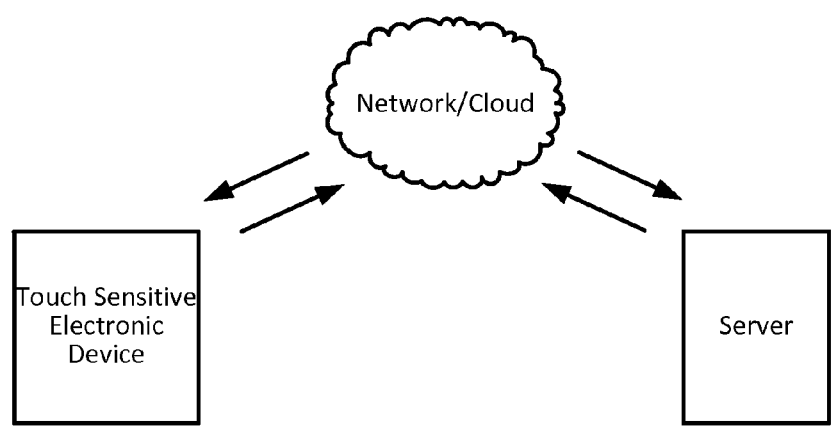
FIG. 2b illustrates a block diagram of a communication system including the electronic touch screen device of FIG. 2a, configured in accordance with an embodiment of the present invention.

FIG. 2b illustrates a block diagram of a communication system configured in accordance with an embodiment of the present invention. As can be seen, the system generally includes an electronic touch sensitive device (such as the one in FIG. 2a) that is capable of communicating with a server via a network/cloud. In this example embodiment, the electronic touch sensitive device may be, for example, an eBook reader, a mobile cell phone, a laptop, a tablet, desktop, or any other touch sensitive computing device. The network/cloud may be a public and/or private network, such as a private local area network operatively coupled to a wide area network such as the Internet. In this example embodiment, the server may be programmed or otherwise configured to receive content requests from a user via the touch sensitive device and to respond to those requests by performing a desired function or providing the user with requested or otherwise recommended content. In some such embodiments, the server is configured to remotely provision multiple accessible reading modes as provided herein to the touch screen device (e.g., via JavaScript or other browser based technology). In other embodiments, portions of the accessible reading modes methodology can be executed on the server and other portions of the methodology can be executed on the device. Numerous server-side/client-side execution schemes can be implemented to facilitate multiple accessible reading modes in accordance with an embodiment, as will be apparent in light of this disclosure.

Accessible Reading Mode Examples

Figure 3A:
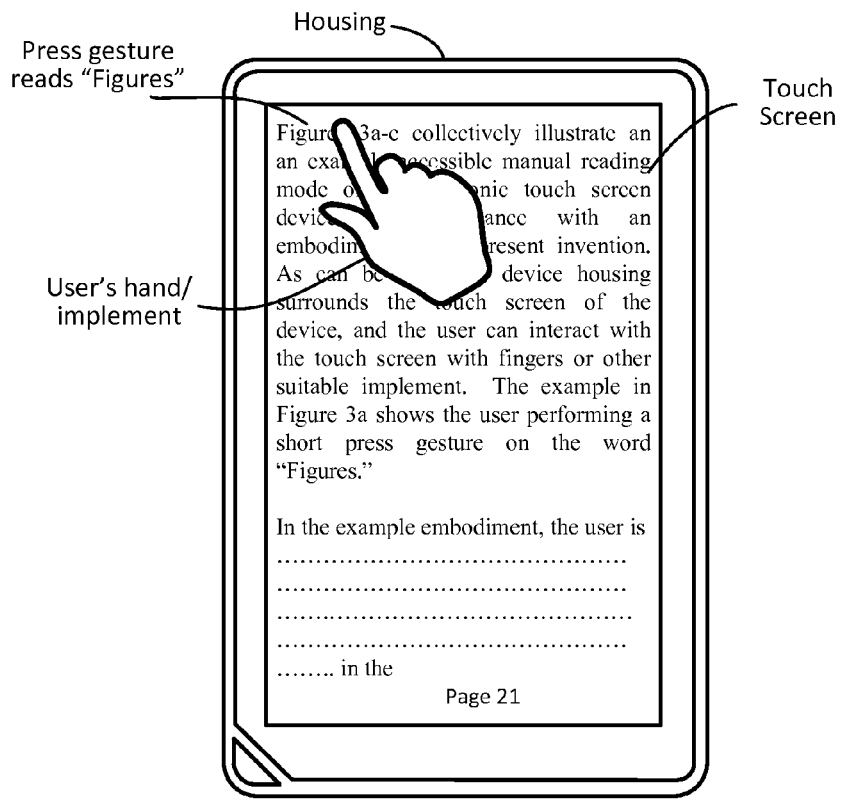
FIGS. 3a-f collectively illustrate an example accessible manual reading mode of an electronic touch screen device, in accordance with an embodiment of the present invention.
Figure 3B:
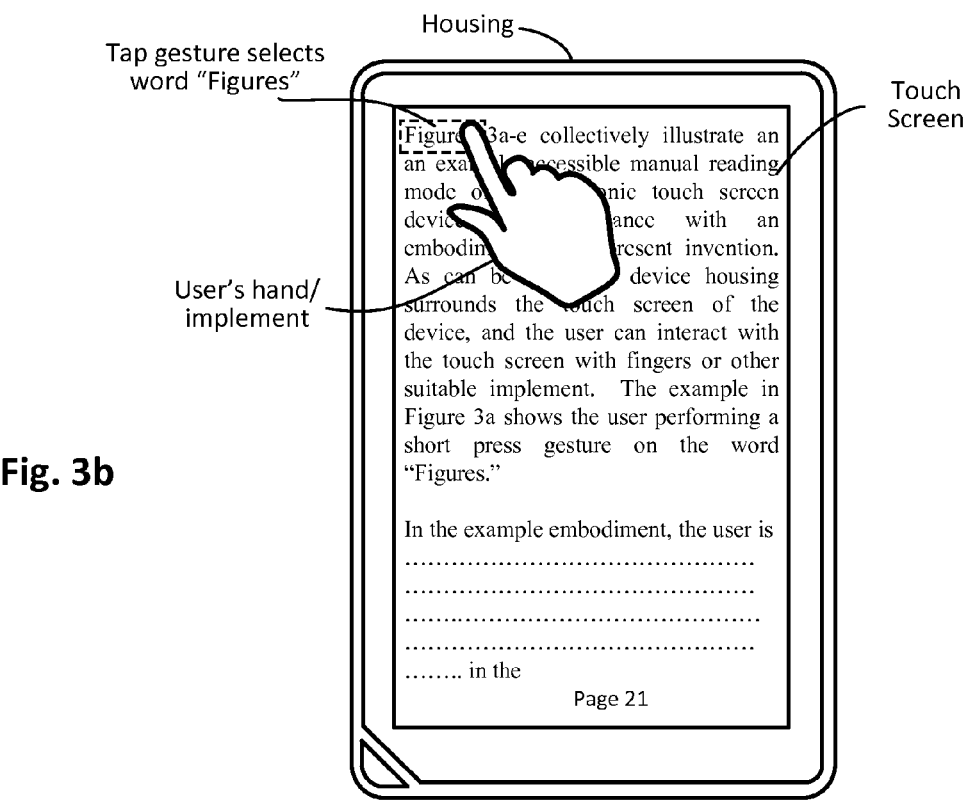
Figure 3C:
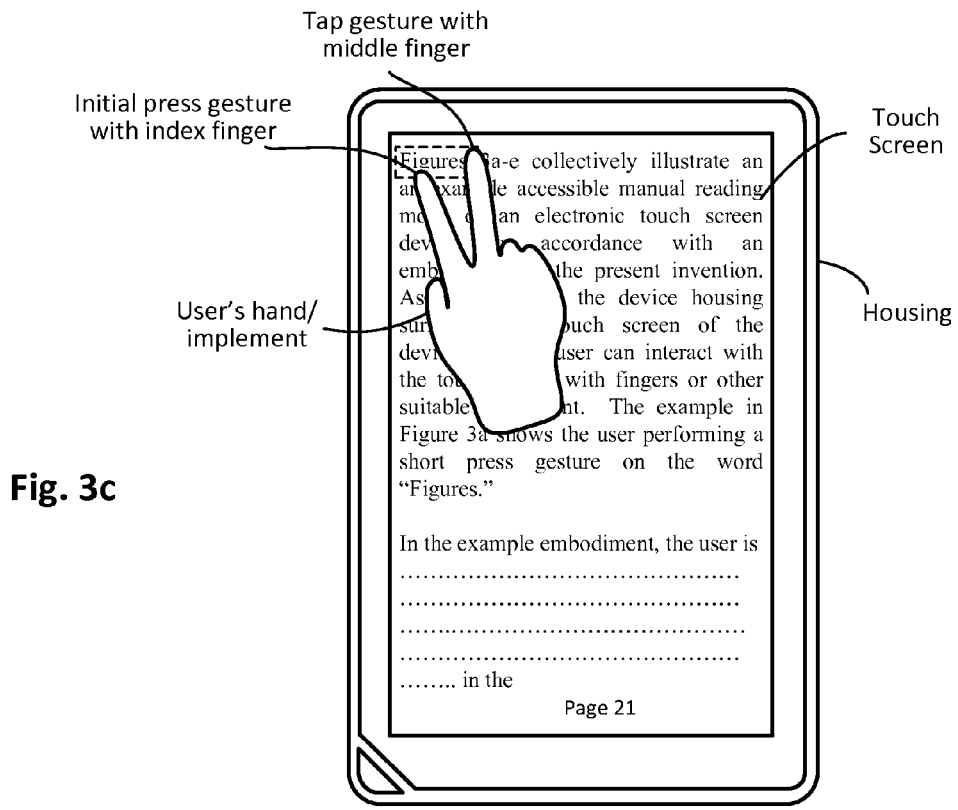

FIGS. 3a-f collectively illustrate an example accessible manual reading mode of an electronic touch screen device, in accordance with an embodiment of the present invention. As can be seen, the device housing surrounds the touch screen of the device, and the user can interact with the touch screen with fingers or other suitable implement. In this embodiment, the text selection function of the manual reading mode has been enabled as shown in FIG. 1f. The example in FIG. 3a shows the user performing a short press gesture on the word "Figures" and this gesture prompts the device to read aloud the word "Figures." In some cases, a short press gesture may last from 0.5-2 seconds in length. The user may press different sections of the screen in order to sample different areas of the textual content, and once the desired word has been read aloud, the user may quickly perform a tap gesture (e.g., within 1-2 seconds after the word has been read aloud), thus selecting that word, as shown in the example of FIG. 3b. In one embodiment, the word selection may be confirmed by playing an earcon, and in this particular example the word is also visually outlined on the device screen. Selecting a word may also set an initial point of a larger text selection, in some embodiments. In some cases, a single tap gesture may be associated with switching from the manual mode to the automatic mode, however in this instance the tap performed shortly after reading aloud a word, selects that word. As seen in FIG. 3c, in one example the press and tap gestures described in FIGS. 3a-b may be performed with two fingers (or other implements) and may overlap, such that the initial press is still being held down when the tap gesture is performed. In this particular example, the user performs the press gesture with the index finger and the tap with the middle finger while continuing to hold the index finger down.

Figure 3D:
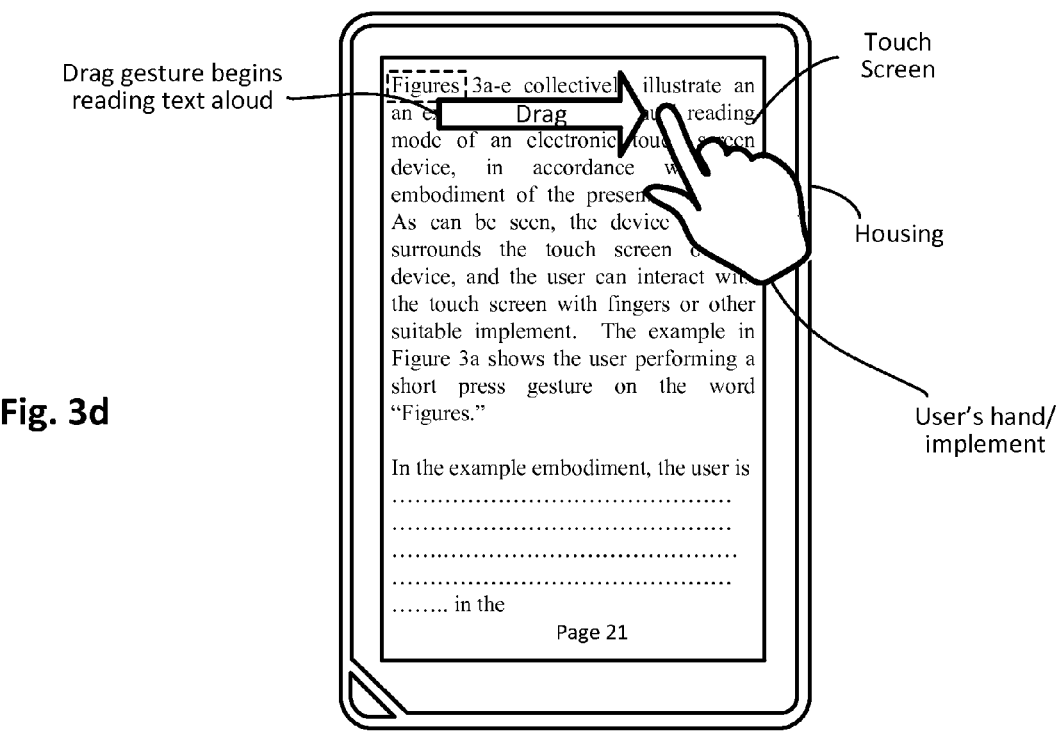
Figure 3E:
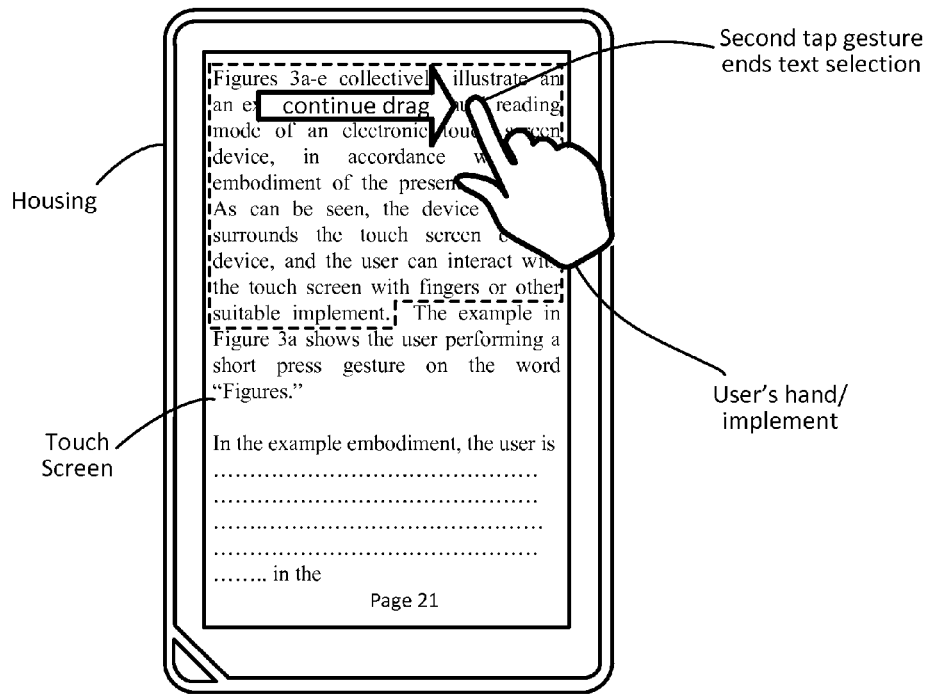
Figure 3F:
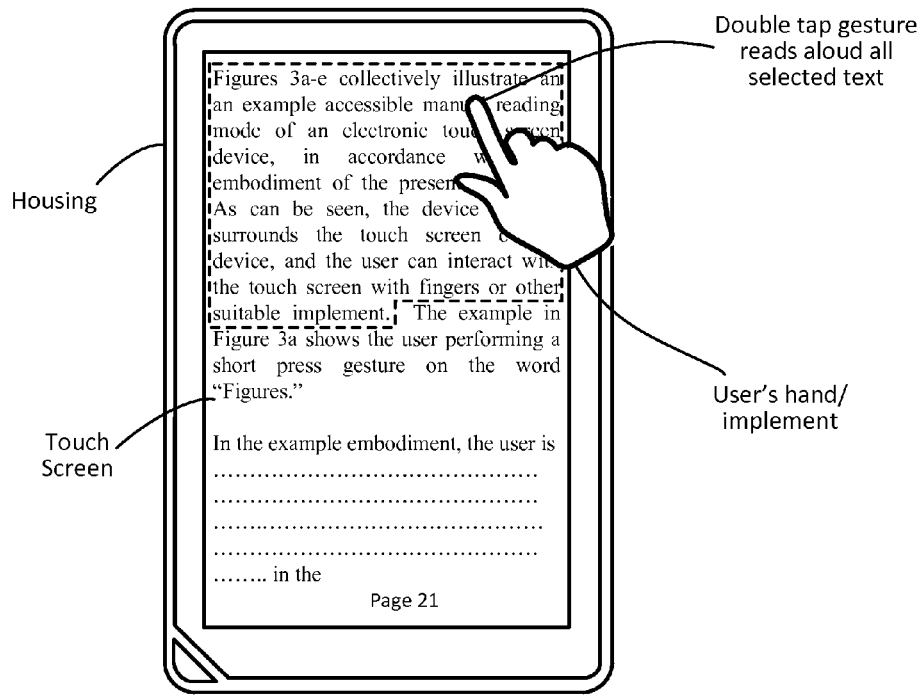

In one embodiment, dragging a contact point to the right, as shown in the example of FIG. 3d, may read aloud the textual content beginning with the selected word. In some cases, the drag gesture may be performed from right to left, thus reading the text backwards. Any text that has been read aloud after the initial selection of the word "Figures," may also be selected. In some cases the user may perform multiple dragging or swiping gestures to continue reading the content as the user's finger reaches the edge of the device screen. As shown in FIG. 3e, the user may continue the dragging gesture until a desired point in the text is reached. Performing a second tap gesture will set an end point of the text selection, and in some cases the text may be outlined or otherwise visually highlighted on the device screen, as shown in this example. Note that in some embodiments, because the user may not be able to see the text on the device screen, the tap gesture does not need to be performed over the last word of the text selection, in this case the word "implement." Rather, the text selection is based on the words that are read aloud to the user and the end point of the text selection is the last word read aloud before the second tap gesture is performed. In some cases, an earcon may confirm the text selection. In the example shown in FIG. 3f, the user performs a double-tap gesture, which is associated with reading aloud any selected content, thus the text beginning with "Figures" and ending with "implement" may be read aloud to the user. If earcons are enabled, the device may aurally present various earcons or audio cues upon passing sentences, paragraphs, pages, chapters, or other boundaries in the text.

Figure 4A:
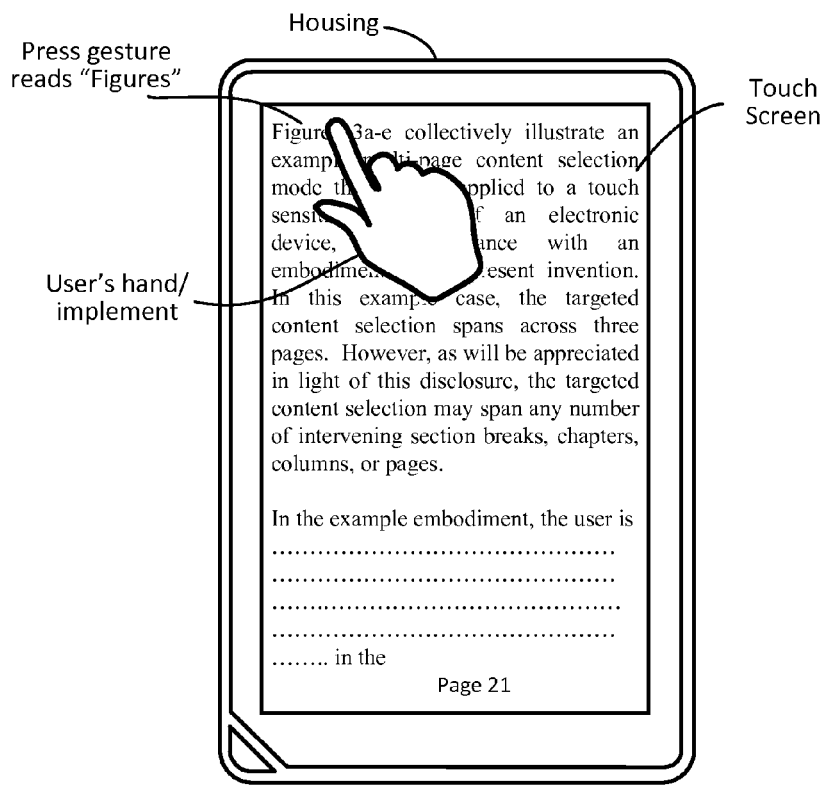
FIGS. 4a-e collectively illustrate an example of multiple accessible reading modes of an electronic touch screen device, in accordance with an embodiment of the present invention.
Figure 4B:
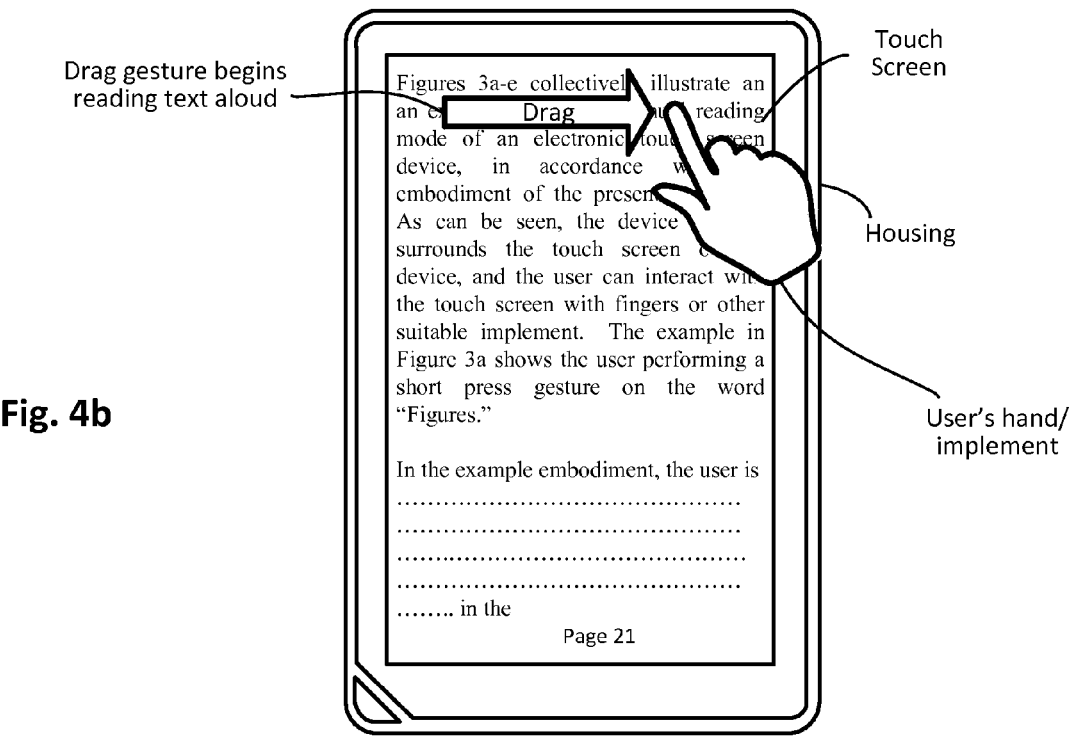
Figure 4C:
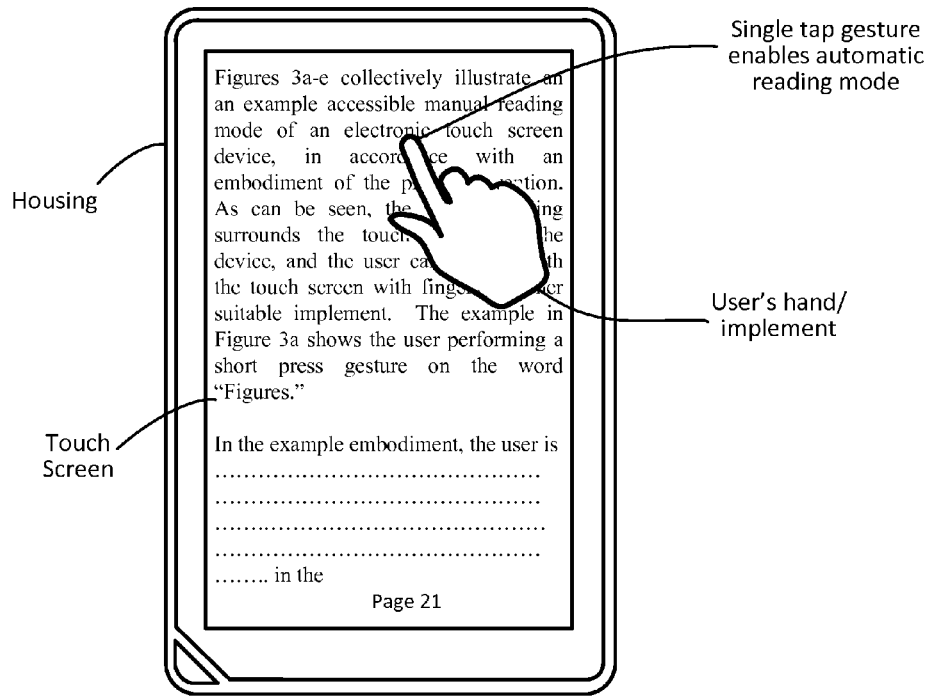
Figure 4D:
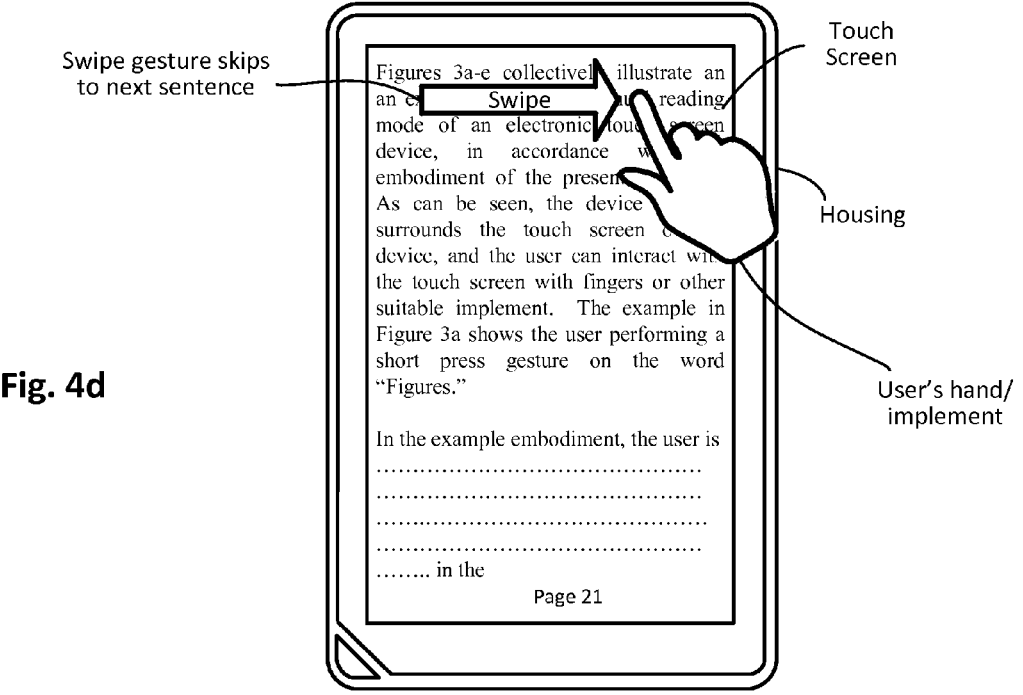
Figure 4E:
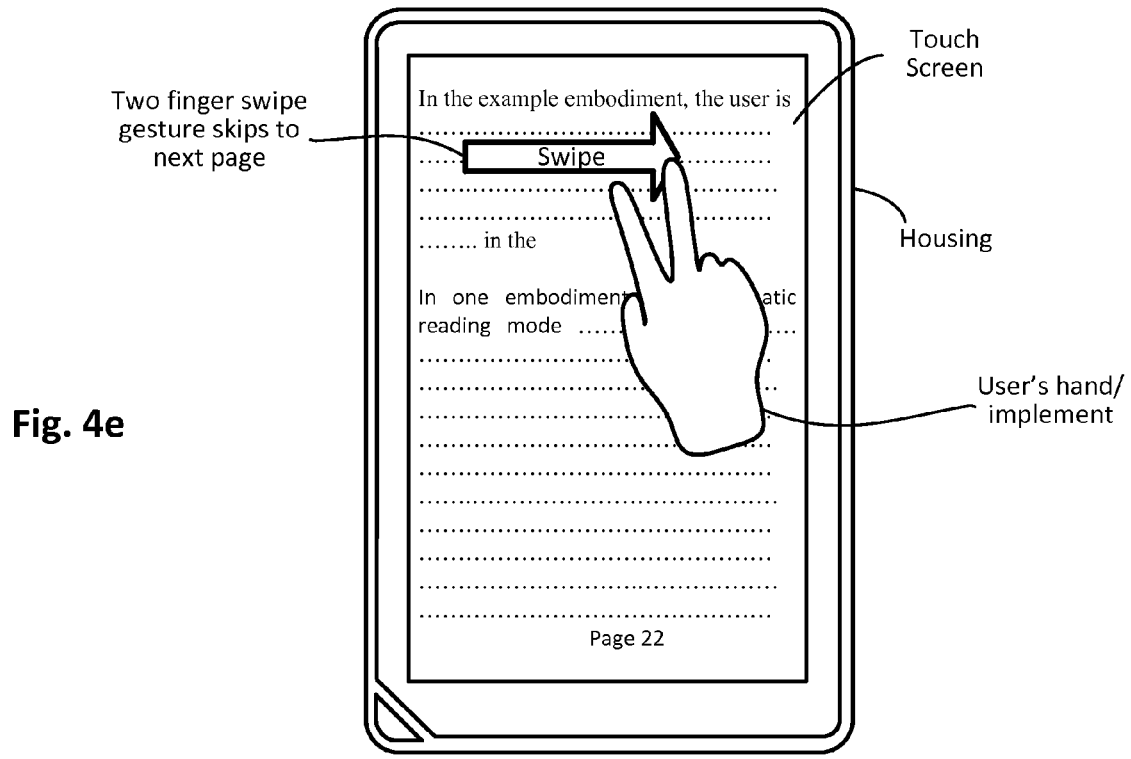

FIGS. 4a-e collectively illustrate an example of multiple accessible reading modes of an electronic touch screen device, in accordance with an embodiment of the present invention. As can be seen, the device housing surrounds the touch screen of the device, and the user can interact with the touch screen with fingers or other suitable implement. The example in FIG. 4a shows the user performing a short press gesture on the word "Figures" and this gesture prompts the device to read aloud the word "Figures." Performing one or more such press gestures may allow users to orient themselves within the text displayed on an electronic device. In some cases, a short press gesture may last from 1-2 seconds in length. Performing a drag gesture, like the one shown in the example of FIG. 4b, begins reading aloud the textual content beginning with the word "Figures." As discussed above, the drag gesture may be performed from left to right or right to left. Up to this point, the user has been operating the device in the manual reading mode. The user may transition into the automatic reading mode, for example, by performing a single tap gesture on the touch screen of the device, as shown in FIG. 4c. As discussed above, the automatic reading mode may continuously read the textual content to the user, in some cases accompanied by earcons to designate content boundaries. In some cases, while in the automatic reading mode the user may perform a swipe gesture with a single contact point in order to skip to the next sentence, as shown in FIG. 4d. In this example, the device begins reading aloud beginning with the word "Figures," and after performing the swipe gesture, the device skips to the next sentence beginning with "As can be seen." In some embodiments, the swipe gesture may also be performed from right to left in order to skip to the beginning of the current or a previous sentence. As shown in the example of FIG. 4e, in some embodiments a swipe gesture performed with two fingers may skip to the next page. The automatic reading mode may begin reading, for example, at the first full sentence of the next page when a two-finger swipe gesture is performed. In other embodiments, the various swipe gestures may be configured to scroll by paragraph, chapter, section, article, or any other desired content boundary. In some cases these gestures and their associated functions may be configured by the user in a configuration sub-menu like the one shown in FIG. 1e, or they may be hard-coded.

Figure 5A:
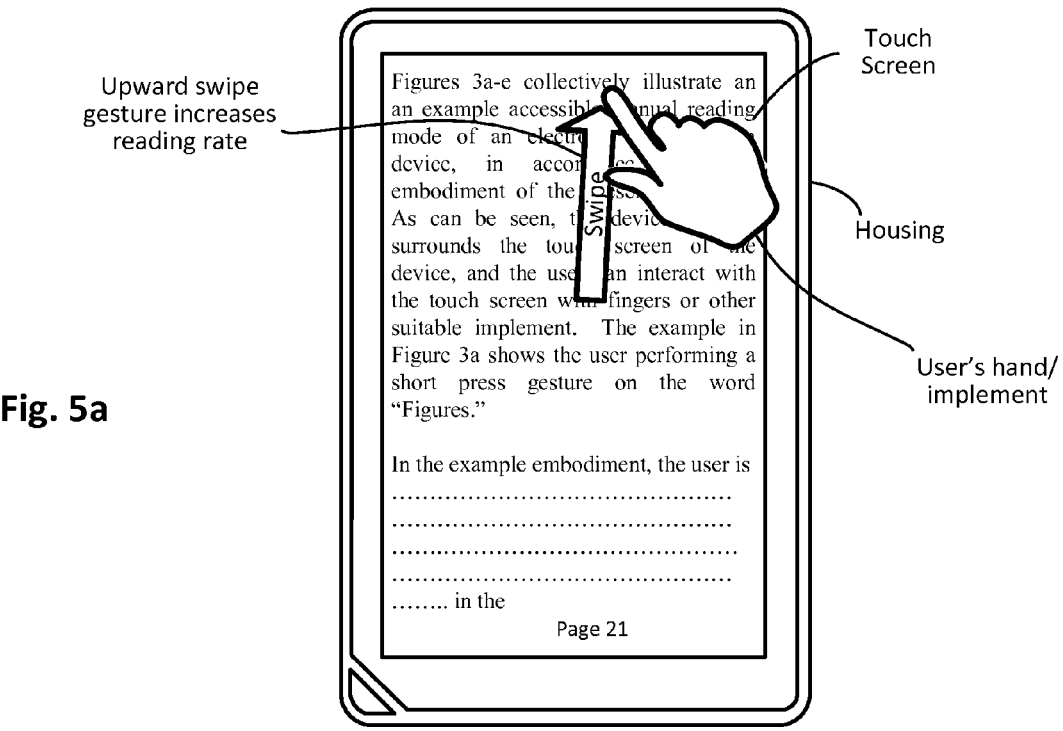
FIGS. 5a-b collectively illustrate an example accessible automatic reading mode of an electronic touch screen device, in accordance with an embodiment of the present invention.
Figure 5B:
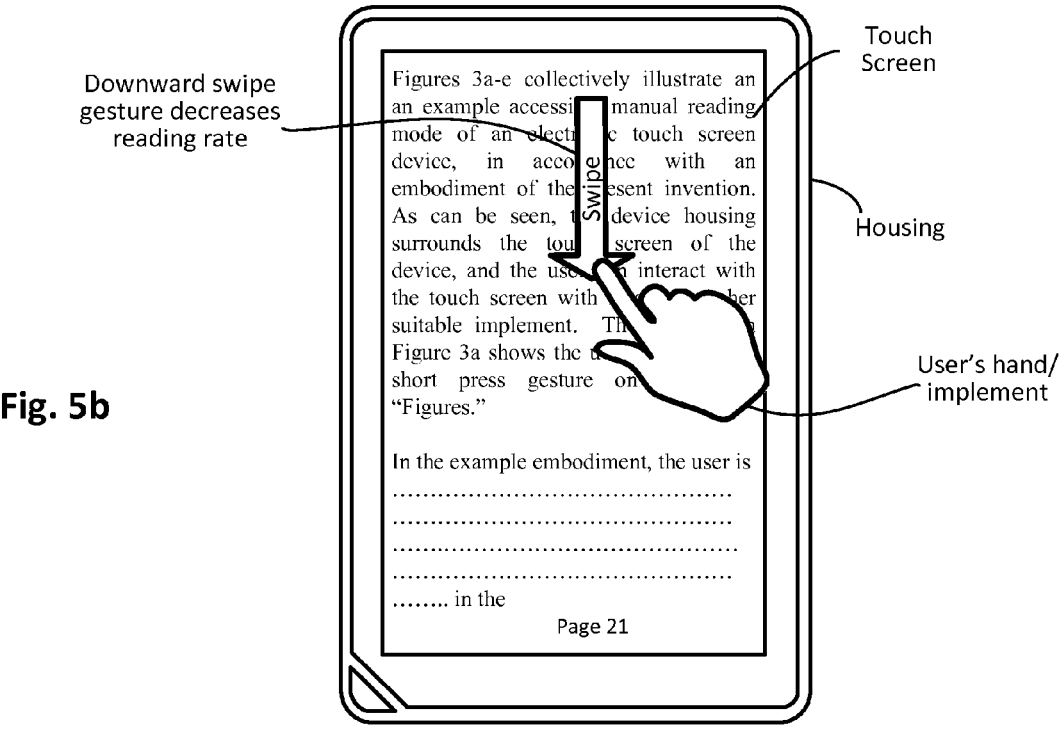

FIGS. 5a-b collectively illustrate an example of an accessible automatic reading mode of an electronic touch screen device, in accordance with an embodiment of the present invention. As can be seen, the device housing surrounds the touch screen of the device, and the user can interact with the touch screen with fingers or other suitable implement. While operating in the automatic reading mode, the user may wish to adjust the rate at which content is read aloud or otherwise aurally presented, in some embodiments. In this particular example, the user has enabled the adjust rate function in the automatic reading mode (e.g., using the configuration sub-menu of FIG. 1e), and has associated that function with a vertical swipe gesture. Thus, in order to increase the reading rate, the user performs an upward substantially vertical swipe gesture, as shown in the example of FIG. 5a. If the user wishes to decrease the reading rate, for example, a downward substantially vertical swipe gesture may be performed as shown in FIG. 5b. The reading rate may be adjusted more or less depending on the length of the swipe gesture, or depending on how many swipe gestures are performed. Note that while the vertical swipe gesture may be associated with adjusting the reading rate while in the automatic reading mode, the same gesture may be associated with navigating through menu options, as described above, while operating in the manual reading mode.

Figure 6A:
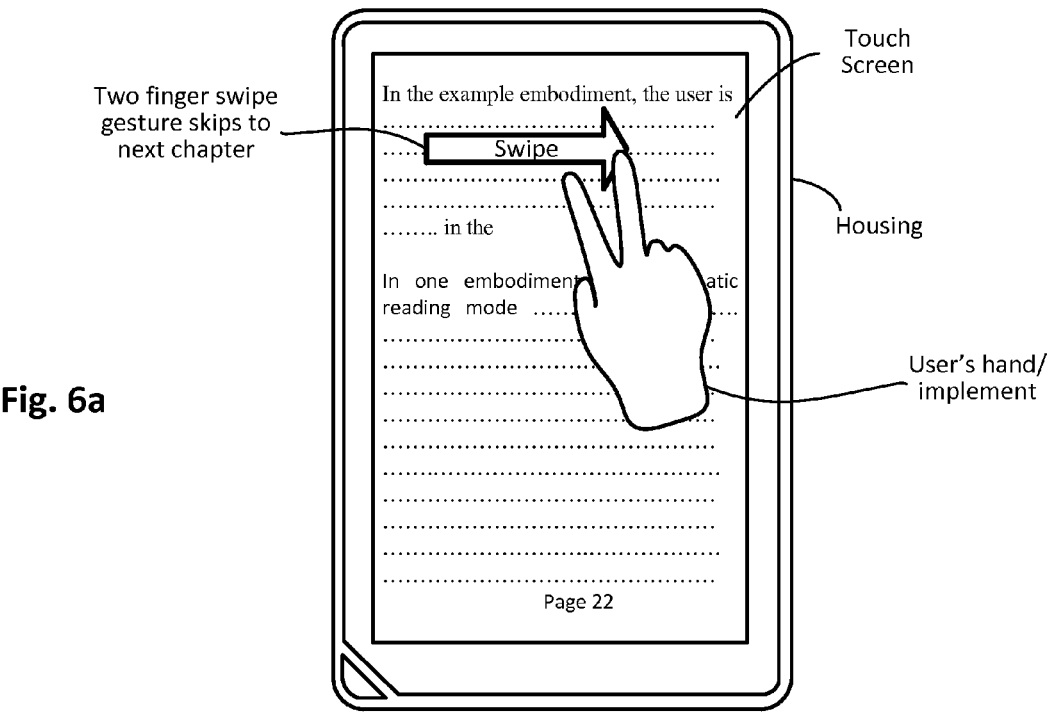
FIGS. 6a-d collectively illustrate an example accessible automatic reading mode of an electronic touch screen device, in accordance with another embodiment of the present invention.
Figure 6B:
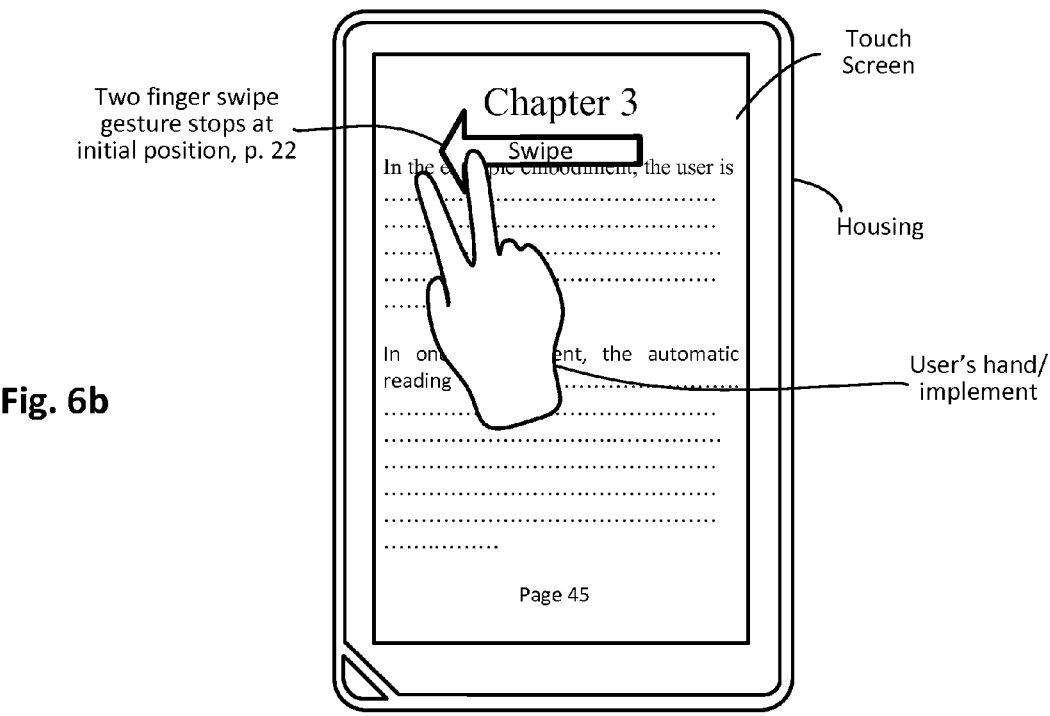
Figure 6C:
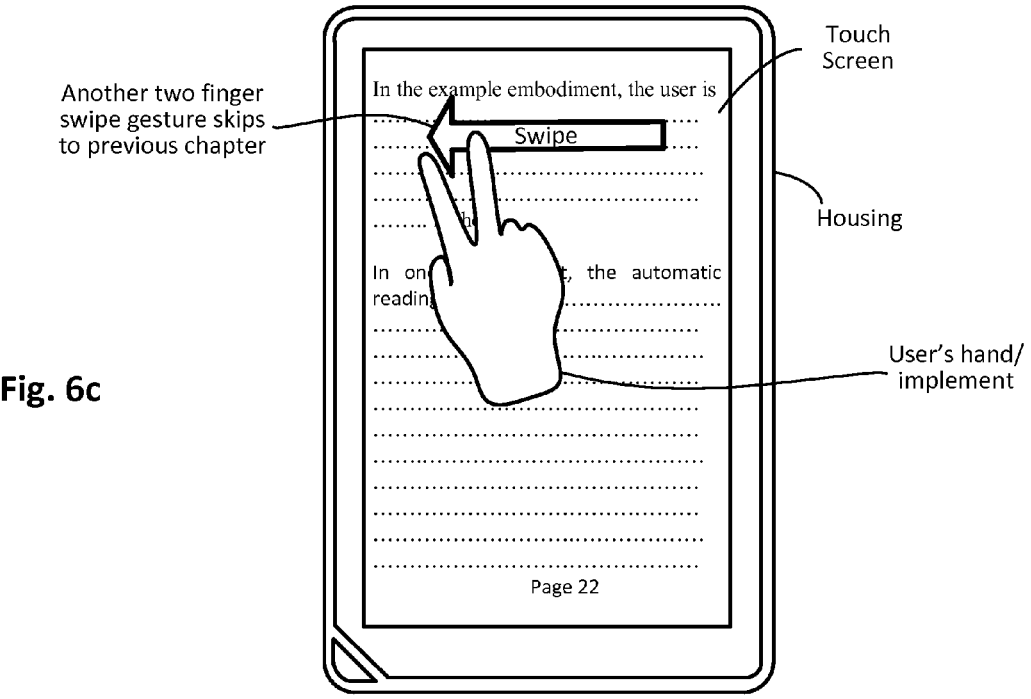
Figure 6D:
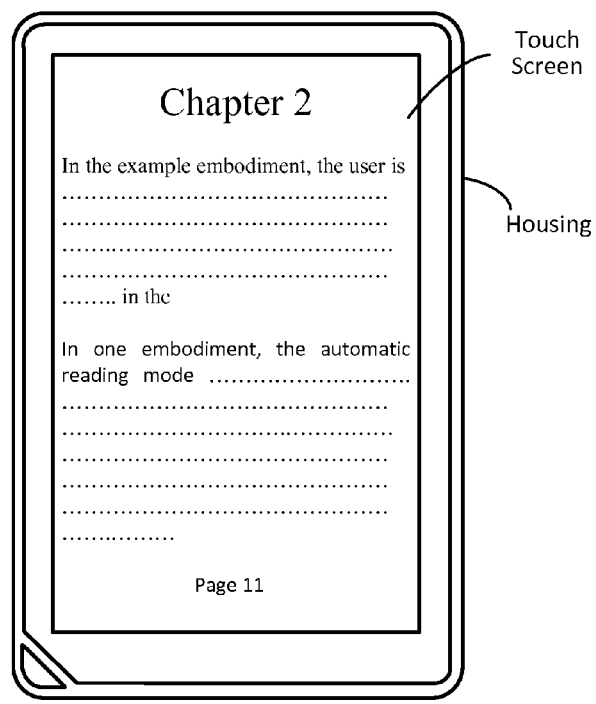

FIGS. 6a-d collectively illustrate an example of an accessible automatic reading mode of an electronic touch screen device, in accordance with an embodiment of the present invention. As can be seen, the device housing surrounds the touch screen of the device, and the user can interact with the touch screen with fingers or other suitable implement. While operating in the automatic reading mode, the user may, for example, wish to scroll ahead or behind in order to preview content or view the beginning of the next chapter, section, article, or some other content boundary. In some cases, users may wish to quickly flip through chapters or sections of content without losing track of their current page. In this particular embodiment, the user has configured a two-finger horizontal swipe gesture to scroll to the next or previous chapter within an eBook. The user is currently reading page 22 of an eBook, as shown in the example of FIG. 6a, and performs a two-finger swipe gesture in order to preview the beginning of the next chapter. This brings the user to page 45, the beginning of chapter 3, as shown in FIG. 6b. The user then performs another two-finger swipe gesture, in this example, but instead of scrolling back to chapter 2, the automatic reading mode makes an additional stop at page 22, the one the user is currently reading. As shown in FIGS. 6c-d, the user may perform another two-finger swipe gesture in order to scroll back from page 22 to the beginning of chapter 2, in this particular embodiment. In some cases, if the user performs any page change command other than a command to flip by chapter (or some other content boundary), like a single-finger page change, using the table of contents, etc., then the chapter-flip sequence ends and the currently reading page is updated to the new page. Such a feature may allow users to easily return to their reading position even after quickly flipping through various chapters of an eBook.

Methodology

Figure 7:
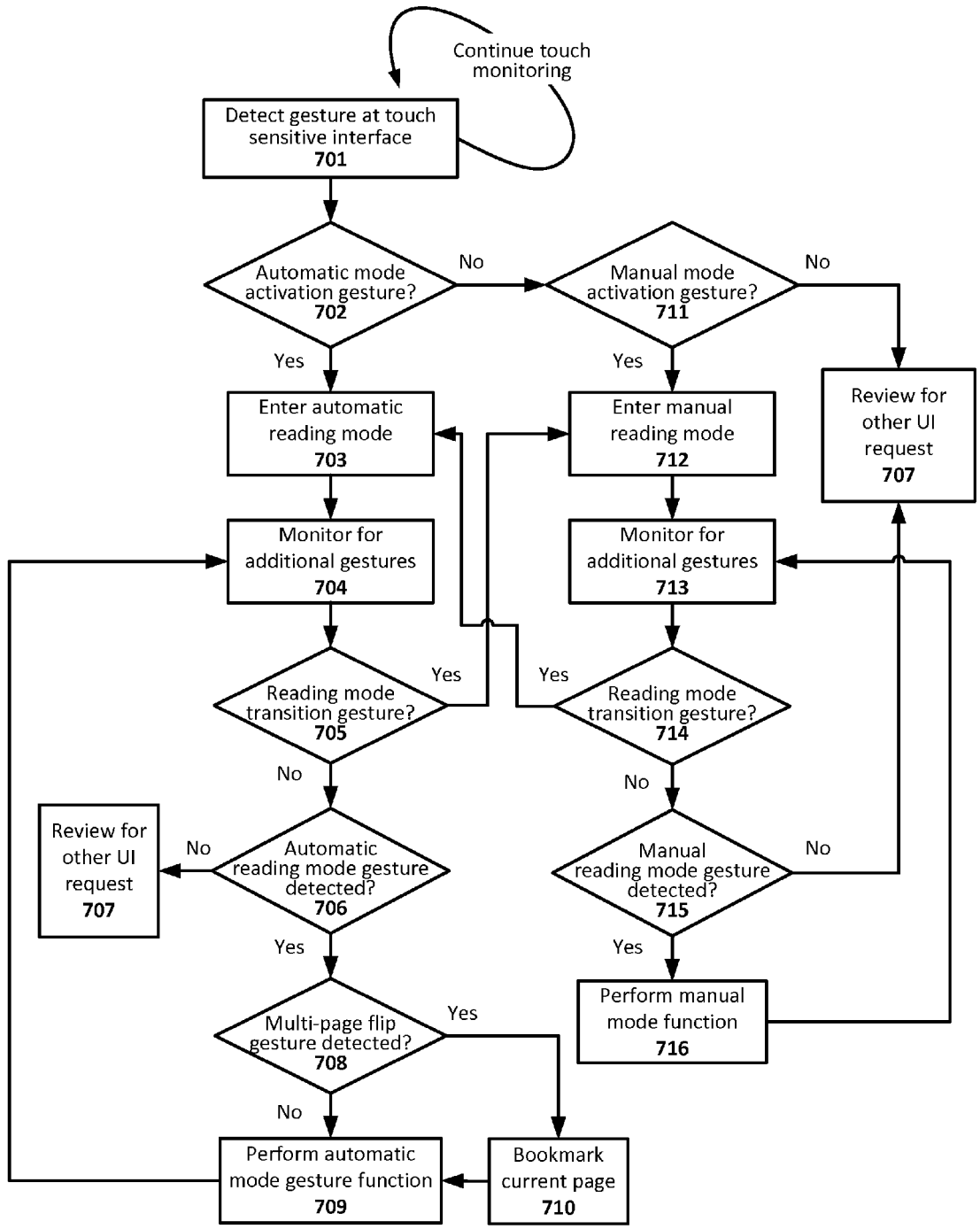
FIG. 7 illustrates a method for providing multiple accessible reading modes in an electronic touch screen device, in accordance with an embodiment of the present invention.

FIG. 7 illustrates a method for providing multiple accessible reading modes in an electronic touch screen device, in accordance with an embodiment of the present invention. This example methodology may be implemented, for instance, by the UI module of the example touch screen device shown in FIG. 2a, or the example touch screen device shown in FIG. 2b (e.g., with the UI provisioned to the client by the server). To this end, the accessible menu navigation mode can be implemented in software, hardware, firmware, or any combination thereof, as will be appreciated in light of this disclosure.

As can be seen, the method generally includes sensing a user's input by a touch screen display. As soon as the user begins to swipe, drag or otherwise move a contact point, the UI code (and/or hardware) can assume a swipe gesture has been engaged and track the path of the contact point with respect to any fixed point within the touch screen until the user stops engaging the touch screen surface. The release point can also be captured by the UI as it may be used to commit the action started when the user pressed on the touch sensitive screen. In a similar fashion, if the user releases hold without moving the contact point, a tap or press or press-and-hold command may be assumed depending on the amount of time the user was continually pressing on the touch sensitive screen. These main detections can be used in various ways to implement UI functionality, including multiple accessible reading modes as variously described herein, as will be appreciated in light of this disclosure.

In this example case, the method includes detecting 701 a user gesture on the touch sensitive interface. As described above, the gesture contact may be performed in any suitable manner using a stylus, the user's finger, or any other suitable implement, and it may be performed on a touch screen surface, a track pad, acoustic sensor, or other touch sensitive surface. The user contact monitoring is essentially continuous. Once a user contact has been detected, the method may continue with determining 702 whether an automatic reading mode activation gesture has been performed. Such a gesture could include, for example, a single-tap, a double-tap, and/or a control feature action. If an automatic reading mode activation gesture has been performed, the method may continue with entering 703 the automatic reading mode. The method may continue with monitoring 704 the touch sensitive device for additional gestures. As discussed above, in some embodiments the automatic reading mode may only allow a limited number of automatic reading mode functions and gestures, and monitoring for gestures in the automatic reading mode may include only monitoring for those gesture types. Once a contact has been detected, the method may continue with determining 705 whether the reading mode transition gesture has been detected. If the reading mode transition gesture has not been detected, the method may continue with determining 706 whether an automatic reading mode gesture has been detected. As previously discussed, the automatic reading mode gestures may include vertical or horizontal swipe gestures performed with one or more contact points. If no automatic reading mode gesture has been detected, the contact may be reviewed 707 for some other UI request. If an automatic reading mode gesture has been detected, the method may continue with determining 708 whether a multi-page flip gesture has been detected. Such gestures may include, for example, a gesture to go to the next or previous chapter, section, article, or some other multi-page content boundary. If no multi-page flip gesture has been detected, the method may continue with performing 709 the automatic mode gesture function. In some cases, the function may include scrolling forward or backward by sentence or paragraph, or adjusting the reading rate. If a multi-page flip gesture has been detected, the method may continue with bookmarking 710 the current page before performing the multi-page flip function. The bookmark may be helpful later if another multi-page flip function is performed because the function may be configured to make an additional stop on the bookmarked page, in some embodiments. After performing the gesture function at 709, the method may continue with monitoring 704 for additional gestures.

If, however, no automatic reading mode activation gesture has been detected at 702, the method may continue with determining 711 whether a manual reading mode activation gesture has been detected. Such a gesture could include, for example, a single-tap, a double-tap, and/or a control feature action. If no manual reading mode activation gesture has been detected, the method may continue with reviewing 707 the contact for other UI requests. If a manual reading mode activation gesture has been detected, the method may continue with entering 712 the manual reading mode. Furthermore, if a reading mode transition gesture has been detected at 705, the method may also continue with entering the manual reading mode. The method may continue with monitoring 713 the touch sensitive device for additional gestures. Once a contact or gesture has been detected, the method may continue with determining 714 whether the reading mode transition gesture has been detected. If the reading mode transition gesture has been detected, the method may continue with entering 703 the automatic reading mode. If no reading mode transition gesture has been detected, the method may continue with determining 715 whether a manual reading mode gesture has been detected. If no manual reading mode gesture has been detected, the contact may be reviewed 707 for some other UI request. If a manual reading mode gesture has been detected, the method may continue with performing 716 the function associated with the manual reading mode gesture. As discussed above, example manual reading mode gestures along with their corresponding functions may include: a short press gesture to aurally sample textual content on the device screen, horizontal dragging gestures to direct the reading of textual content, vertical swipe gestures to navigate through menu options, a combination of tap gestures to define the beginning and end of a text selection, or a double-tap gesture to read aloud a text selection. Once the manual reading mode function has been performed, the method may continue with monitoring 713 for additional gestures. Note that at any point during the method, the accessible reading modes may be paused or abandoned completely by performing an exit gesture, pressing the device's home button, putting the device to sleep, or performing some other gesture or control feature action.

Numerous variations and embodiments will be apparent in light of this disclosure. One example embodiment of the present invention provides a device including a touch sensitive surface for allowing user input. The device also includes an accessible user interface including an automatic reading mode configured to automatically and continuously aurally present textual content from a predetermined point with a selected voice font, volume, and rate; and a manual reading mode configured to perform an action including at least one of: aurally present textual content at a current read point or that is selected, navigate menu options, share content, select content, add notes to content, adjust reading rate, adjust voice font, and/or adjust volume in response to one or more corresponding gestures; and wherein the accessible user interface is configured to transition between the automatic reading mode and the manual reading mode in response to a transition gesture. In some cases, the accessible user interface is further configured to activate the automatic reading mode in response to an automatic reading mode activation gesture, and to activate the manual reading mode in response to a manual reading mode activation gesture. In some cases, the automatic reading mode is further configured to aurally present one or more earcons in response to at least one of: passing a sentence, paragraph, page, slide, article, chapter, and/or content section. In some cases, the accessible user interface is further configured to aurally present one or more earcons in response to at least one of: confirming a user action, accepting a menu option, selecting content, entering an automatic reading mode, entering a manual reading mode, navigating through a menu, and/or adjusting a settings option. In some cases, the automatic reading mode is further configured to perform at least one of: adjust reading rate, scroll by sentence, scroll by paragraph, scroll by page, and/or scroll by chapter in response to a corresponding swipe gesture. In some such cases, the automatic reading mode is displaying a page that is not the beginning of a chapter and the mode is configured to create a virtual bookmark on the currently displayed page if a gesture is performed to scroll to the next or previous chapter, wherein the bookmark prompts the automatic reading mode to make an additional stop on the bookmarked page while scrolling over that page. In some cases, the automatic reading mode is configured to disregard all contacts on the touch sensitive surface other than commands to adjust reading rate, scroll by sentence, scroll by page, and/or scroll by chapter. In some cases, the manual reading mode is further configured to aurally present textual content in forward order in response to a horizontal drag gesture performed toward the right, and in reverse order in response to a horizontal drag gesture performed toward the left. In some cases, the manual reading mode is further configured to aurally present selected textual content in response to a double-tap gesture. In some cases, the touch sensitive surface is a touch screen display and the manual reading mode is further configured to aurally present a word to the user in response to a short press gesture performed over the word. In some such cases, the manual reading mode is further configured to select the word in response to a first tap gesture performed after the word is aurally presented, navigate to a terminating word in response to one or more navigation gestures, and select all text between the word and the terminating word in response to a second tap gesture performed after the terminating word has been presented to the user. In some such cases, the first tap gesture is performed while the short press gesture is still being held.

Another example embodiment of the present invention provides a mobile computing system including a processor and a touch sensitive surface for allowing user input, and an accessible user interface executable on the processor and including an automatic reading mode configured to automatically and continuously aurally present textual content from a predetermined point with a selected voice font, volume, and rate; and a manual reading mode configured to perform an action including at least one of: aurally present textual content at a current read point or that is selected, navigate menu options, share content, select content, add notes to content, adjust reading rate, adjust voice font, and/or adjust volume in response to one or more corresponding gestures, and wherein the accessible user interface is configured to transition between the automatic reading mode and the manual reading mode in response to a transition gesture. In some cases, the automatic reading mode is further configured to perform at least one of: adjust reading rate, scroll by sentence, scroll by paragraph, scroll by page, and/or scroll by chapter in response to a corresponding gesture on the touch sensitive surface. In some cases, the automatic reading mode is further configured to aurally present one or more earcons in response to at least one of: passing a sentence, paragraph, page, slide, article, chapter, and/or content section.

Another example embodiment of the present invention provides a computer program product including a plurality of instructions non-transiently encoded thereon to facilitate operation of an electronic device according to a process. The computer program product may include one or more computer readable mediums such as, for example, a hard drive, compact disk, memory stick, server, cache memory, register memory, random access memory, read only memory, flash memory, or any suitable non-transitory memory that is encoded with instructions that can be executed by one or more processors, or a plurality or combination of such memories. In this example embodiment, the process is configured to receive at a touch sensitive surface an accessible automatic reading mode activation gesture; automatically and continuously aurally present textual content from a predetermined point with a selected voice font, volume, and rate in response to the accessible automatic reading mode activation gesture; receive at a touch sensitive surface an accessible manual reading mode activation gesture, the manual reading mode configured to perform an action including at least one of: aurally present textual content at a current read point or that is selected, navigate menu options, share content, select content, add notes to content, adjust reading rate, adjust voice font, and/or adjust volume in response to one or more corresponding gestures; and transition between the automatic reading mode and the manual reading mode in response to a transition gesture. In some cases, the touch sensitive surface is a touch screen display and the process is further configured to receive at the touch screen display a short press gesture performed over a first word; and aurally present the first word to the user. In some such cases, the process is further configured to select the first word in response to a first tap gesture received on the touch screen display after the word is aurally presented; navigate to a terminating word in response to the one or more navigation gestures received at the touch screen display; aurally present the terminating word to the user; and select all content between the first word and the terminating word in response to a second tap gesture received on the touch screen display after the terminating word has been presented to the user. In some cases, the touch sensitive surface is a touch screen display and the process is further configured to proceed to an adjacent page in response to a page turning gesture received at the touch screen display; and proceed to the beginning of an adjacent chapter in response to a chapter scrolling gesture received at the touch screen display. In some such cases, the process is further configured to create a virtual bookmark on a currently displayed page if a chapter scrolling gesture is received, the currently displayed page not being the beginning of a chapter; and make an additional stop on the bookmarked page in response to a subsequent chapter scrolling gesture prompting the process to proceed over the bookmarked page.

The foregoing description of the embodiments of the invention has been presented for the purposes of illustration and description. It is not intended to be exhaustive or to limit the invention to the precise form disclosed. Many modifications and variations are possible in light of this disclosure. It is intended that the scope of the invention be limited not by this detailed description, but rather by the claims appended hereto.

What is claimed is:

1. A device, comprising:
   a touch sensitive surface allowing user input; and
   an accessible user interface facilitating use of the touch sensitive surface by a visually impaired user by configuring an entire surface of the touch sensitive surface as a single control feature for receiving touch gestures, the touch gestures including at least one of one or more taps, one or more presses, one or more press-and-holds, and one or more swipes in any direction, the accessible user interface configured to:
      receive at the touch sensitive surface an automatic reading mode activation gesture, the automatic reading mode configured to:
         automatically and continuously aurally present textual content from a predetermined point with a selected voice font, volume, and rate;
         disregard all contacts on the touch sensitive surface other than touch gestures received anywhere on the touch sensitive surface to transition out of the automatic reading mode, and touch gestures received anywhere on the touch sensitive surface to adjust at least one of reading rate, scroll by sentence, scroll by page, and scroll by chapter; and create a virtual bookmark by the automatic reading mode on a currently displayed page if a gesture is performed to scroll to another chapter, and the currently displayed page is not at the beginning of a chapter, wherein the virtual bookmark prompts an additional stop on the corresponding bookmarked page in response to a subsequent chapter scrolling gesture to proceed over the bookmarked page; and receive at the touch sensitive surface a manual reading mode activation gesture, the manual reading mode configured to perform an action including at least one of: aurally present textual content at a current read point or that is selected, navigate menu options, share content, select content, add notes to content, adjust reading rate, adjust voice font, and adjust volume in response to the one or more corresponding touch gestures received anywhere on the touch sensitive surface; and wherein the accessible user interface is configured to transition between the automatic reading mode and the manual reading mode in response to a transition gesture received anywhere on the touch sensitive surface.

2. The device of claim 1 wherein the accessible user interface is further configured to activate the automatic reading mode in response to an automatic reading mode activation gesture, and to activate the manual reading mode in response to a manual reading mode activation gesture.

3. The device of claim 1 wherein the automatic reading mode is further configured to aurally present one or more earcons in response to at least one of: passing a sentence, paragraph, page, slide, article, chapter, and content section.

4. The device of claim 1 wherein the accessible user interface is further configured to aurally present one or more earcons in response to at least one of: confirming a user action, accepting a menu option, selecting content, entering an automatic reading mode, entering a manual reading mode, navigating through a menu, and adjusting a settings option.

5. The device of claim 1 wherein the automatic reading mode is further configured to perform at least one of: scroll by paragraph and scroll by chapter in response to a corresponding swipe gesture.

6. The device of claim 1 wherein the manual reading mode is further configured to aurally present textual content in forward order in response to a horizontal drag gesture performed toward the right, and in reverse order in response to a horizontal drag gesture performed toward the left.

7. The device of claim 1 wherein the manual reading mode is further configured to aurally present selected textual content in response to a double-tap gesture.

8. The device of claim 1 wherein the touch sensitive surface is a touch screen display and the manual reading mode is further configured to aurally present a word to a user in response to a short press gesture performed over the word.

9. The device of claim 8 wherein the manual reading mode is further configured to select the word in response to a first tap gesture performed after the word is aurally presented, navigate to a terminating word in response to one or more navigation gestures, and select all text between the word and the terminating word in response to a second tap gesture performed after the terminating word has been presented to the user.

10. The device of claim 9 wherein the first tap gesture is performed while the short press gesture is still being held.

11. A mobile computing system, comprising:

a processor and a touch sensitive surface allowing user input; and an accessible user interface executable on the processor, the accessible user interface facilitating use of the touch sensitive surface by a visually impaired user by configuring an entire surface of the touch sensitive surface as a single control feature for receiving touch gestures, the touch gestures including at least one of one or more taps, one or more presses, one or more press and holds, and one or more swipes in any direction, the accessible user interface configured to:

receive at the touch sensitive surface an automatic reading mode activation gesture, the automatic reading mode configured to:

automatically and continuously aurally present textual content from a predetermined point with a selected voice font, volume, and rate;

disregard all contacts on the touch sensitive surface other than touch gestures received anywhere on the touch sensitive surface to transition out of the automatic reading mode, and touch gestures received anywhere on the touch sensitive surface to adjust at least one of reading rate, scroll by sentence, scroll by page, and scroll by chapter; and create a virtual bookmark by the automatic reading mode on a currently displayed page if a gesture is performed to scroll to another chapter, and the currently displayed page is not at the beginning of a chapter, wherein the virtual bookmark prompts an additional stop on the corresponding bookmarked page in response to a subsequent chapter scrolling gesture to proceed over the bookmarked page; and receive at the touch sensitive surface a manual reading mode activation gesture, the manual reading mode configured to perform an action including at least one of: aurally present textual content at a current read point or that is selected, navigate menu options, share content, select content, add notes to content, adjust reading rate, adjust voice font, an adjust volume in response to the one or more corresponding touch gestures received anywhere on the touch sensitive surface, and wherein the accessible user interface is configured to transition between the automatic reading mode and the manual reading mode in response to a transition gesture received anywhere on the touch sensitive surface.

12. The system of claim 11 wherein the automatic reading mode is further configured to perform at least one of: scroll by paragraph, and scroll by chapter in response to a corresponding gesture on the touch sensitive surface.

13. The system of claim 11 wherein the automatic reading mode is further configured to aurally present one or more earcons in response to at least one of: passing a sentence, paragraph, page, slide, article, chapter, and content section.

14. A non-transitory computer program product comprising a plurality of instructions encoded thereon that, when executed by a processor, cause a process to be carried out, the process comprising:

receiving at a touch sensitive surface an accessible automatic reading mode activation gesture, the accessible automatic reading mode facilitating use of the touch sensitive surface by a visually impaired user by configuring an entire surface of the touch sensitive surface as a single control feature for receiving touch gestures, and the touch gestures include at least one of one or more taps, one or more presses, one or more press and holds, and one or more swipes in any direction, the accessible automatic reading mode comprising:

automatically and continuously aurally presenting textual content from a predetermined point with a selected voice font, volume, and rate in response to the accessible automatic reading mode activation gesture;

disregarding all contacts on the touch sensitive surface other than
- touch gestures received anywhere on the touch sensitive surface to transition out of the automatic reading mode, and
- touch gestures received anywhere on the touch sensitive surface to adjust at least one of reading rate, scroll by sentence, scroll by page, and scroll by chapter; and creating a virtual bookmark on a currently displayed page if a chapter scrolling gesture is received, the currently displayed page is not at the beginning of a chapter, and making an additional stop on the corresponding bookmarked page in response to a subsequent chapter scrolling gesture prompting the process to proceed over the bookmarked page; and receiving at a touch sensitive surface an accessible manual reading mode activation gesture, the manual reading mode performing an action including at least one of: aurally presenting textual content at a current read point or that is selected, navigating menu options, sharing content, selecting content, adding notes to content, adjusting reading rate, adjusting voice font, and adjust volume in response to the one or more corresponding touch gestures received anywhere on the touch sensitive surface; and transitioning between the automatic reading mode and the manual reading mode in response to a transition gesture received anywhere on the touch sensitive surface.

15. The non-transitory computer program product of claim 14 wherein the touch sensitive surface is a touch screen display and wherein the process further comprises:
receiving at the touch screen display a short press gesture performed over a first word; and
aurally presenting the first word to a user.

16. The non-transitory computer program product of claim 15 wherein the process further comprises:
selecting the first word in response to a first tap gesture received on the touch screen display after the word is aurally presented;
navigating to a terminating word in response to the one or more touch gestures received at the touch screen display;
present presenting the terminating word to the user; and
selecting all content between the first word and the terminating word in response to a second tap gesture received on the touch screen display after the terminating word has been presented to the user.

17. The non-transitory computer program product of claim 15 wherein the touch sensitive surface is a touch screen display and the process further comprises:
proceeding to an adjacent page in response to a page turning gesture received at the touch screen display; and
proceeding to the beginning of an adjacent chapter in response to a chapter scrolling gesture received at the touch screen display.

* * * * *